(12) United States Patent
Yoshizawa et al.

(10) Patent No.: US 7,556,879 B2
(45) Date of Patent: Jul. 7, 2009

(54) POLYMER ELECTROLYTE FUEL CELL

(75) Inventors: Koudai Yoshizawa, Yokosuka (JP); Yasukazu Iwasaki, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 699 days.

(21) Appl. No.: 10/519,554

(22) PCT Filed: May 28, 2003

(86) PCT No.: PCT/JP03/06683

§ 371 (c)(1),
(2), (4) Date: Dec. 28, 2004

(87) PCT Pub. No.: WO2004/006368

PCT Pub. Date: Jan. 15, 2004

(65) Prior Publication Data

US 2005/0233201 A1    Oct. 20, 2005

(30) Foreign Application Priority Data

Jul. 2, 2002   (JP) ............... 2002-192912

(51) Int. Cl.
*H01M 2/14* (2006.01)
*H01M 8/04* (2006.01)
(52) U.S. Cl. ............... 429/38; 429/24; 429/25; 429/26
(58) Field of Classification Search ............ 429/38, 429/25, 26, 24
See application file for complete search history.

(56) References Cited

U.S. PATENT DOCUMENTS

| | | | |
|---|---|---|---|
| 4,588,661 A * | 5/1986 | Kaufman et al. ............ 429/36 |
| 5,932,366 A * | 8/1999 | Ringel ............ 429/26 |
| 6,071,634 A | 6/2000 | Fellows | |
| 6,150,049 A * | 11/2000 | Nelson et al. ............ 429/39 |

(Continued)

FOREIGN PATENT DOCUMENTS

EP   1 286 404 A2   2/2003

(Continued)

OTHER PUBLICATIONS

European Search Report issued in corresponding European Patent Application No. 06021735.3-1227, dated Mar. 12, 2007.

(Continued)

*Primary Examiner*—Patrick Ryan
*Assistant Examiner*—Thomas H. Parsons
(74) *Attorney, Agent, or Firm*—McDermott Will & Emery LLP

(57) ABSTRACT

A fuel cell includes a membrane electrode assembly 21 and a bipolar plate 24 disposed outside the membrane electrode assembly 21. The bipolar plate 24 is porous, and has first gas passages 33 formed on the top surface through which gas is passed, second gas passages 35 formed on the undersurface through which gas is passed, communicating passages 34 which allow the first gas passages 33 and second gas passages 35 to communicate, a gas inlet 31 connected to one of the first gas passages 33 and second gas passages 35 for supplying gas, and a gas outlet 37 connected to the other of the first gas passages 33 and second gas passages 35 for discharging gas.

21 Claims, 25 Drawing Sheets

U.S. PATENT DOCUMENTS

| | | | |
|---|---|---|---|
| 7,049,016 B2 * | 5/2006 | Takahashi et al. | 429/13 |
| 2002/0004158 A1 | 1/2002 | Suzuki et al. | |
| 2002/0055031 A1 | 5/2002 | Fujii et al. | |
| 2002/0058168 A1 | 5/2002 | Voss et al. | |
| 2003/0129468 A1 | 7/2003 | Issacci et al. | |

FOREIGN PATENT DOCUMENTS

| | | |
|---|---|---|
| JP | 9-511356 | 11/1997 |
| JP | 11-111311 | 4/1999 |
| JP | 2002-151104 | 5/2002 |
| JP | 2002-203579 A | 7/2002 |

OTHER PUBLICATIONS

Standaert et al., "Analytical Fuel Cell Modeling," Journal of Power Sources, Feb. 1998, pp. 181-199, vol. 70, No. 2, Elsevier, Amsterdam.

* cited by examiner

FIG. 24A  FIG. 24B

POLYMER ELECTROLYTE FUEL CELL

FIELD OF THE INVENTION

The present invention relates to a fuel cell, and more particularly to a polymer electrolyte fuel cell.

BACKGROUND OF THE INVENTION

A fuel cell converts chemical energy in fuel directly to electrical energy. A pair of electrodes is installed on either side of an electrolyte membrane, fuel gas containing hydrogen is supplied to the anode and an oxidizing gas containing oxygen is supplied to the cathode. Electrical energy is then extracted using the following electrochemical reaction which takes place on the surfaces of the electrolyte membrane.

Anode reaction: $H_2 \rightarrow 2H^+ + 2e^-$ (1)

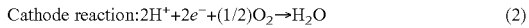

Cathode reaction: $2H^+ + 2e^- + (1/2)O_2 \rightarrow H_2O$ (2)

The fuel gas supplied to the anode can be supplied directly from a hydrogen storage device (e.g., high-pressure tank, liquid hydrogen tank or metal hydride tank), or by supplying hydrogen-containing gas obtained by reforming fuel containing hydrogen (e.g., natural gas, methanol or gasoline). The oxidizing gas supplied to the cathode is generally air.

As shown by equation (2), when the fuel cell is operating, water is produced at the cathode. Also, part of the produced water diffuses from the cathode to the anode, and is discharged from the anode. At this time, if there is a region where too much water vapor is present in the passage supplying the fuel gas, liquid water is produced and flooding will occur. If the gas supply is blocked due to the liquid water, the cell performance decreases and the power generation capacity falls. As shown in equation (2), this water is produced by the reaction, and as the water amount increases as the fuel gas flows from upstream to downstream in the fuel cell, flooding easily occurs in the vicinity of the fuel cell outlet.

JP9-511356A published by the Japanese Patent Office in 1997, discloses a way of preventing flooding by controlling the temperature distribution in the fuel cell. In this prior art, flooding is prevented by making the gas and the coolant flow in the same direction, increasing the temperature from the gas inlet to the outlet, and controlling the temperature distribution in the fuel cell. Due to this, the water produced is incorporated with the gas as steam, and flooding is prevented.

SUMMARY OF THE INVENTION

However, in the aforesaid prior art, the gas temperature is raised, so the gas discharged from the fuel cell is at a high temperature. As a result, the water amount discharged from the fuel cell to the outside increases and easily gives rise to "dryout", which makes it difficult to obtain a water balance in the fuel cell. Therefore, a water recovery device must be installed downstream of the fuel cell, and the system becomes more complex.

It is therefore an object of this invention to prevent flooding and dryout in a polymer electrolyte fuel cell.

In order to achieve above object, this invention provides a fuel cell, comprising a membrane electrode assembly, and a bipolar plate disposed outside the membrane electrode assembly. The bipolar plate is porous, and comprises a first gas passage formed on a surface on one side of the membrane electrode assembly, a second gas passage formed on another surface on the opposite side of the membrane electrode assembly, a communicating passage which allows the first gas passage and second gas passage to communicate with each other, a gas inlet for introducing gas connected to one of the first gas passage and second gas passage, and a gas outlet for discharging gas connected to the other of the first gas passage and second gas passage.

According to an aspect of this invention, this invention provides a fuel cell, comprising a membrane electrode assembly, a bipolar plate disposed outside the membrane electrode assembly and a cooling mechanism which cools the bipolar plate. The bipolar plate is solid, and comprises a gas inlet for introducing gas, a gas outlet for discharging gas, a first gas passage formed on a surface on the side of the membrane electrode assembly, whereof one end is connected to the gas inlet and the other end is connected to a return part, and a second gas passage formed parallel to the first gas passage on the surface on the side of the membrane electrode assembly, whereof one end is connected to the first gas passage via the return part and the other end is connected to the gas outlet, and the cooling mechanism cools the bipolar plate so that the temperature of the gas flowing through the first gas passage is lower, the nearer the gas inlet is.

The details as well as other features and advantages of this invention are set forth in the remainder of the specification and are shown in the accompanying drawings.

DESCRIPTION OF THE PREFERRED EMBODIMENTS

Embodiment 1

Figure 1:
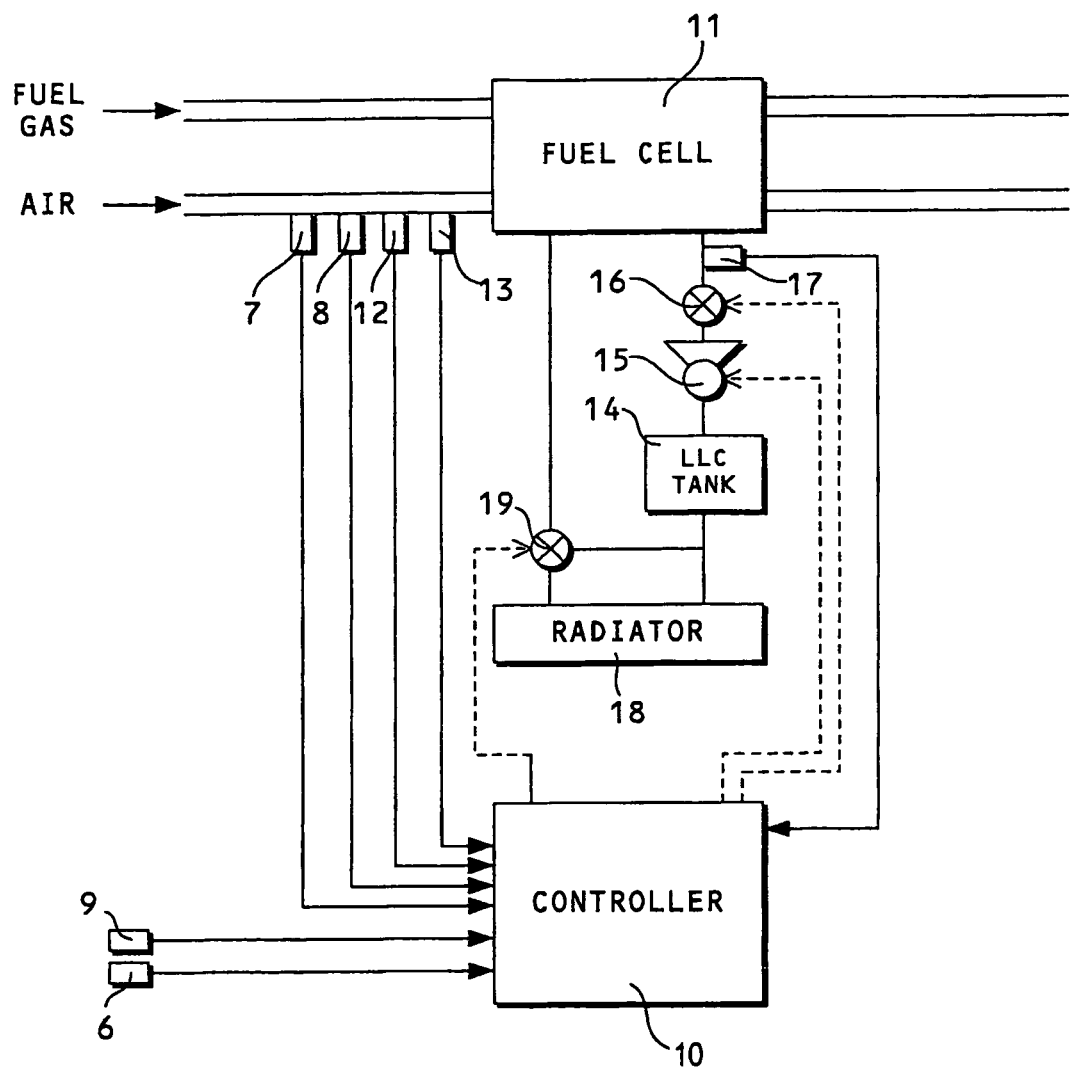
FIG. 1 is a diagram showing the construction of a polymer electrolyte fuel cell system according to this invention.

Referring to FIG. 1 of the drawings, FIG. 1 shows a polymer electrolyte fuel cell system according to this invention. This embodiment uses a porous bipolar plate, and by allowing water to flow inside the bipolar plate, makes the water distribution in the cell uniform, and prevents flooding and dryout.

This fuel cell system comprises a fuel cell 11, an ammeter 6 which detects the output current of the fuel cell 11, a flowrate sensor 7 which detects the flowrate of air supplied to the fuel cell 11, a pressure sensor 8 which detects the pressure of air supplied to the fuel cell 11, an outside air temperature sensor 9 which detects the outside air temperature, a temperature sensor 12 which detects the temperature of the air at the inlet to the fuel cell 11, and a humidity sensor 13 which detects the humidity of the air at the inlet of the fuel cell 11.

To maintain the fuel cell 11 at a suitable temperature, the system comprises an LLC recycling system which recycles long-life coolant (LLC) inside the fuel cell 11. LLC may for example be a mixture of ethylene glycol and water. The LLC recycling system comprises an LLC tank 14, pump 15, valve 16 temperature sensor 17, radiator 18 and bypass valve 19.

The running state of the fuel cell 11 is controlled by a controller 10. The controller 10 computes the target values of LLC inlet temperature and LLC temperature gradient from a gas flowrate signal from the flowrate sensor 7, gas temperature signal from the temperature sensor 12, gas humidity signal from the humidity sensor 13, and outside air temperature signal from the outside air temperature sensor 9, and then controls the LLC flowrate and the heat radiation amount of the radiator 18 based on the computed target values.

Figure 2:
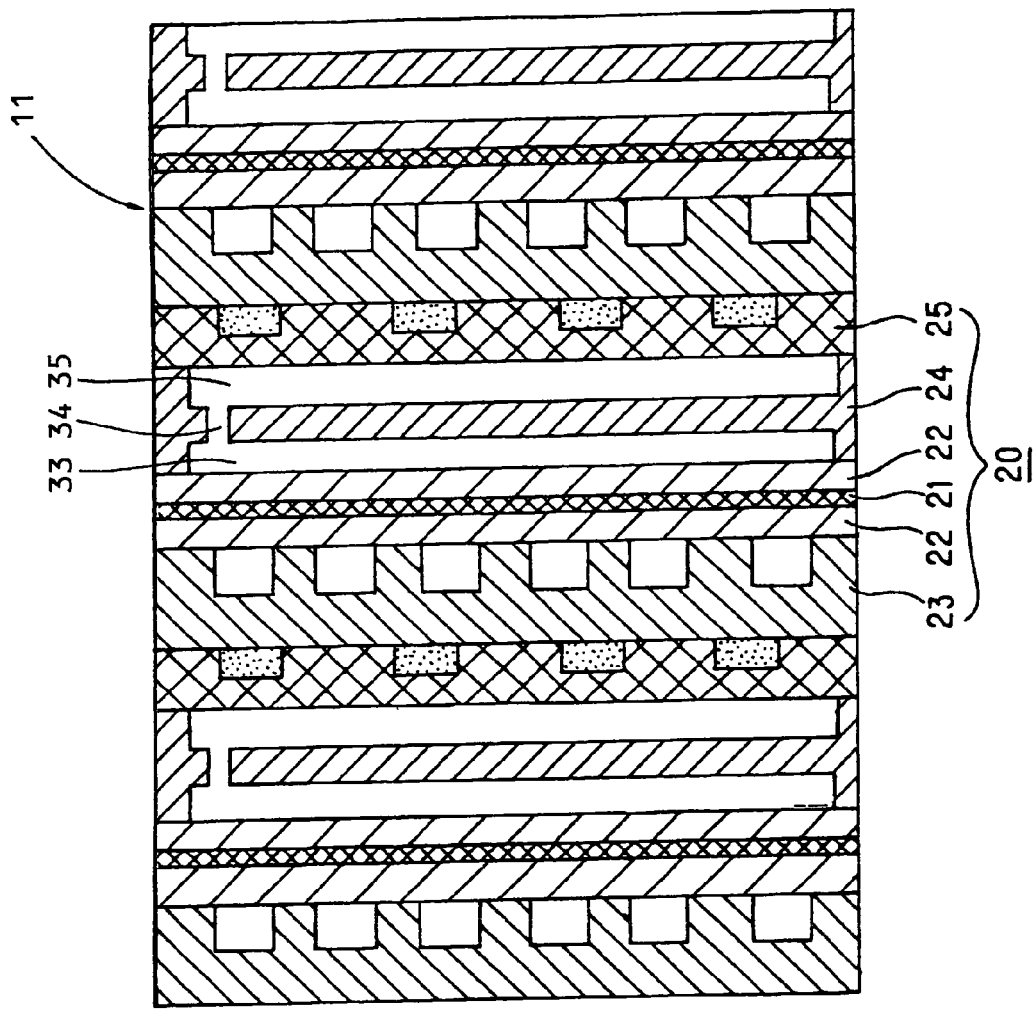
FIG. 2 is a cross-sectional view of the fuel cell.

FIG. 2 is a sectional view of the fuel cell 11. The fuel cell comprises a plurality of cells 20.

The cell 20 comprises a membrane electrode assembly (MEA) 21 having electrode layers on both surfaces of a solid polymer membrane, gas diffusion layers 22 provided on both sides of the MEA 21, anode bipolar plate 23 and cathode bipolar plate 24 installed outside the gas diffusion layers 22, and LLC plate 25 installed outside the cathode bipolar plate 24. Fuel gas flows through passages formed on the anode bipolar plate 23, and air flows through passages formed on the cathode bipolar plate 24. These gases respectively diffuse in the gas diffusion layers 24, and power is generated by an electrochemical reaction which occurs on the surfaces of the MEA 21. The cathode bipolar plate 24 is porous and allows permeation of water. The anode bipolar plate 23 is solid, and does not allow permeation of water.

Figures 3A, 3B, 3C:
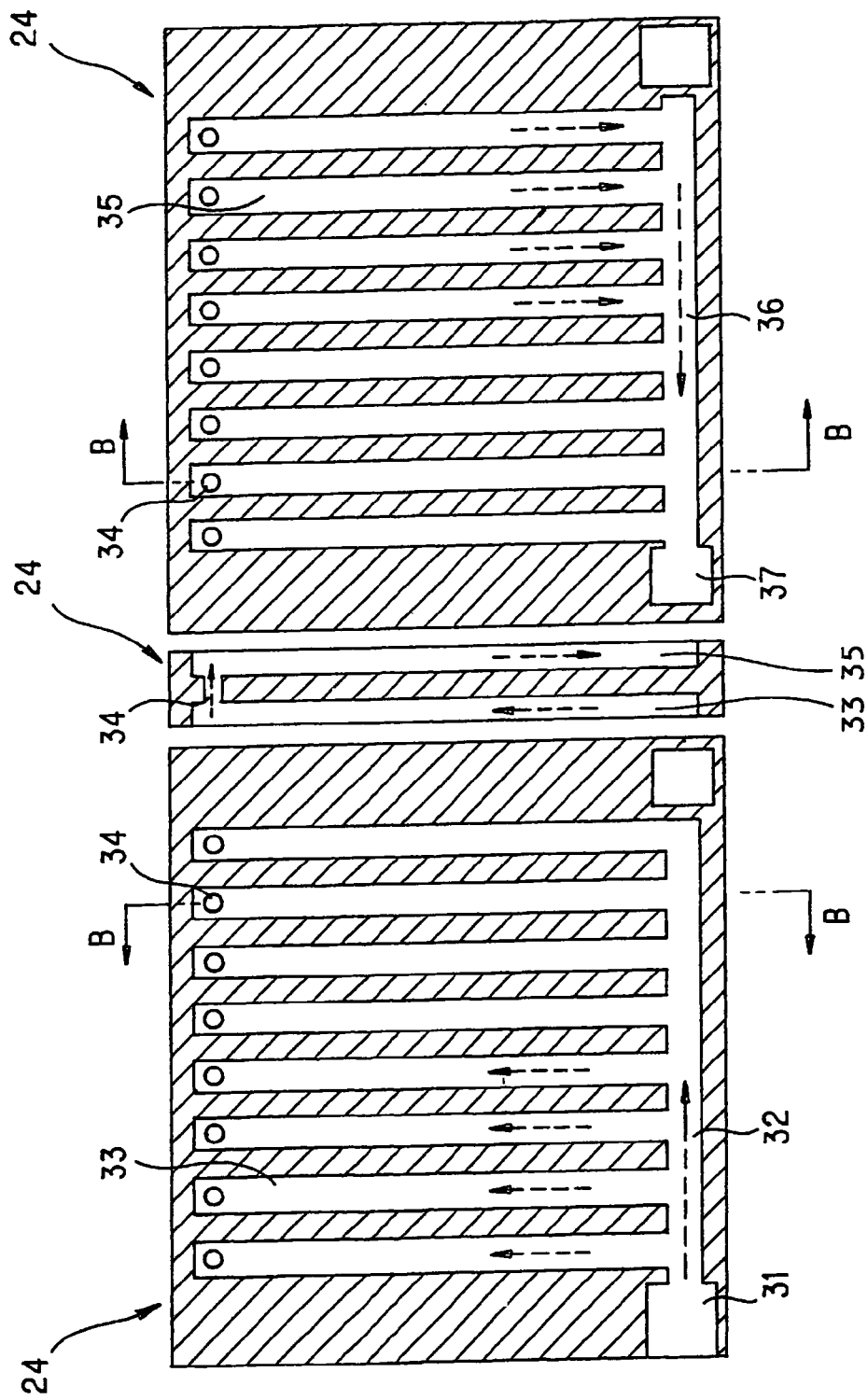
FIGS. 3A-3C are diagrams showing gas passages of a cathode bipolar plate of the fuel cell.

FIGS. 3A-3C show the passages of the cathode bipolar plate 24. FIG. 3A shows the surface (top surface) of the MEA 21, FIG. 3B shows a section through a line B-B of FIG. 3A and FIG. 3C, and FIG. 3C shows the opposite surface (undersurface) of the MEA 21.

First gas passages 33 are formed on the top surface of the cathode bipolar plate 24, and second gas passages 35 are formed on the undersurface exactly opposite to the first gas passages 33, i.e., so that the second gas passages 35 are back-to-back with the first gas passages 33. The first gas passages 33 and second gas passages 35 are connected by connecting passages 34. The connecting passages 34 are through-holes passing through the cathode bipolar plate 24.

The gas (in this case, air) passes from the gas inlet 31 through the gas inlet manifold 32, is diverted to the first gas passages 33 formed on the surface (top surface) of the MEA 21, passes through the connecting passages 34, and flows through the second gas passages 35 formed on the surface (undersurface) on the opposite side of the MEA 21. It then reaches the gas outlet manifold 36, and is discharged from the gas outlet 37.

Figure 4:
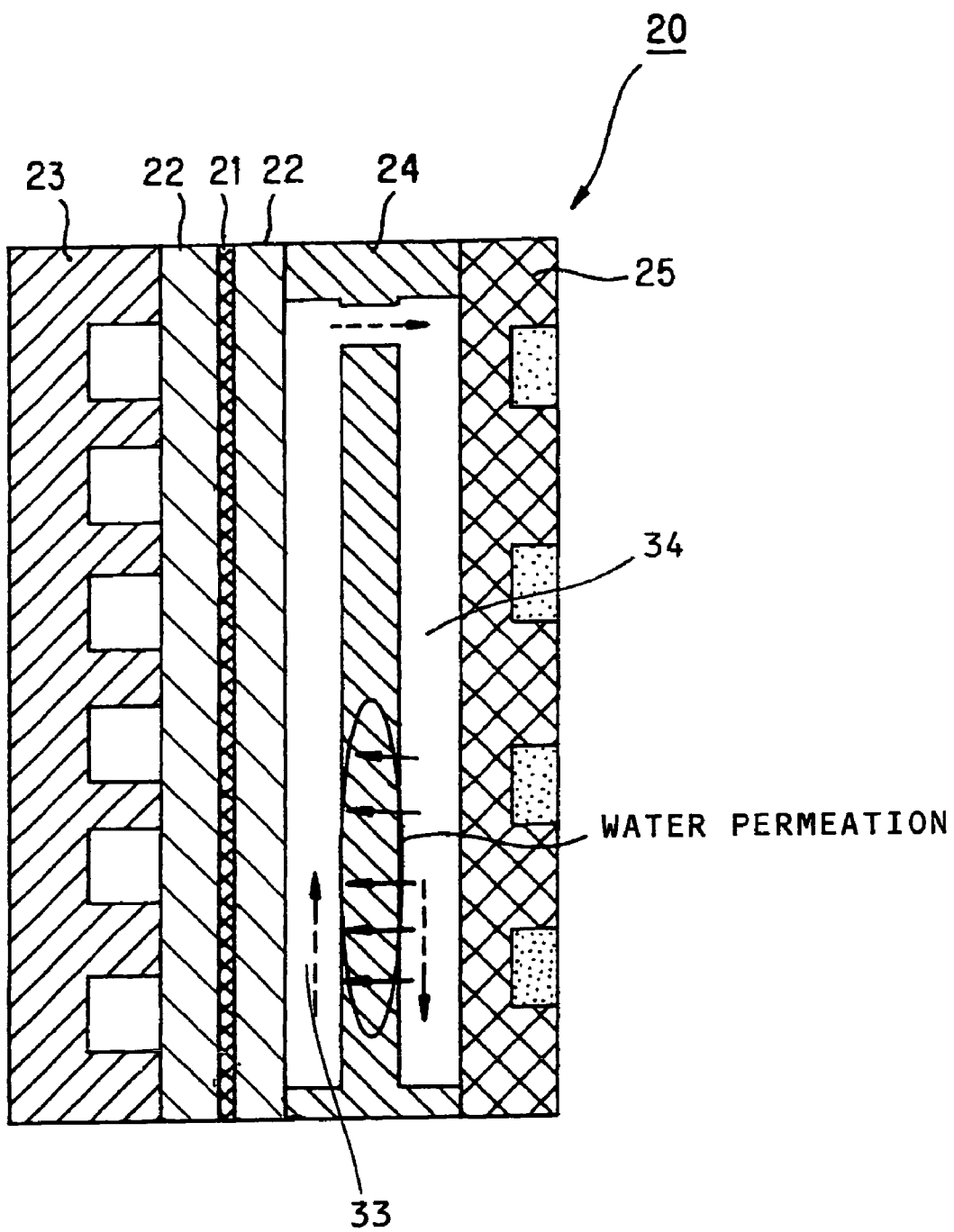
FIG. 4 is a cross-sectional view of the fuel cell.

The movement of water in the cathode plate 24 will now be described referring to FIG. 4. FIG. 4 shows a cross-section of the cell 20, the solid arrows in the figure showing water movement in the cell and the dotted arrows in the figure showing gas flow in the cell.

The cathode bipolar plate 24 is porous, and contains a large number of holes, so water can move inside the plate 24. Also, when water fills the inside of the plate 24, gas does not leak from the top surface to the undersurface through the plate 24 due to the surface tension of the water.

The LLC plate 25 is on the opposite side of the cathode bipolar plate 24 to the MEA 21, the gas which flows through the second gas passages 35 is cooled by the LLC, and reaches a lower temperature than the gas flowing through the first gas passages 33. The gas flowing through the second gas passages 35 is cooled, and the water vapor which exceeds the saturation water vapor pressure condenses to become liquid. The condensed water passes through the cathode bipolar plate 24, and moves to the first gas passages 33.

When the outside air is dry, the dry gas flows into the first gas passages 33. When the dry gas flows into the first gas passages 33, the water in the MEA 21 is removed by the dry gas, and tends to be dried out in the vicinity of the cell inlet. However, according to this embodiment, gas is cooled in the second gas passages 35, the water condenses, and the condensed water moves into the first gas passages 33 via the porous plate 24. Therefore, the condensed water is supplied to the dry part, and the water distribution in the cell is maintained uniform.

Also, as the cathode bipolar plate 24 is porous, when there is too much water in the first gas passages 33, the excess water can be discharged to the second gas passages 35 via the plate 24, whereas conversely, when the humidity of the air flowing through the first gas passages 33 is low, the water which has liquefied in the second gas passages 34 is supplied to the first gas passages 33 via the plate 24, and prevents dryout of the gas flowing through the first gas passages 33. In this way, the water distribution in the cell is kept uniform, dryout in the first gas passages 33 is prevented, and flooding in the second gas passages 35 is prevented.

The gas flowing through the second gas passages 35 is cooled by the LLC plate 25, so condensation of water in the second gas passages 35 is promoted, and movement of water from the second gas passages 35 to the first gas passages 33 is promoted.

The second gas passages 33 are formed underneath the position in the cathode bipolar plate 24 where the first gas passages 33 are formed, so water moves via the plate 24 throughout the whole of the first gas passages 33 and second gas passages 35, and the water distribution in the cell is maintained more uniform.

The gas outlet manifold 36 is formed underneath the gas inlet manifold 32, so water is effectively supplied from the outlet gas which contains a large amount of condensed water, to the inlet gas.

Further, the first gas passages 33 and second gas passages 35 are connected by the connecting passages 34 which are through-holes formed in the cathode bipolar plate 24, so the construction of the fuel cell 11 is simplified and more compact.

Herein, only the cathode bipolar plate 24 is porous, but the anode bipolar plate 24 may also be porous.

Embodiment 2

Figure 5:
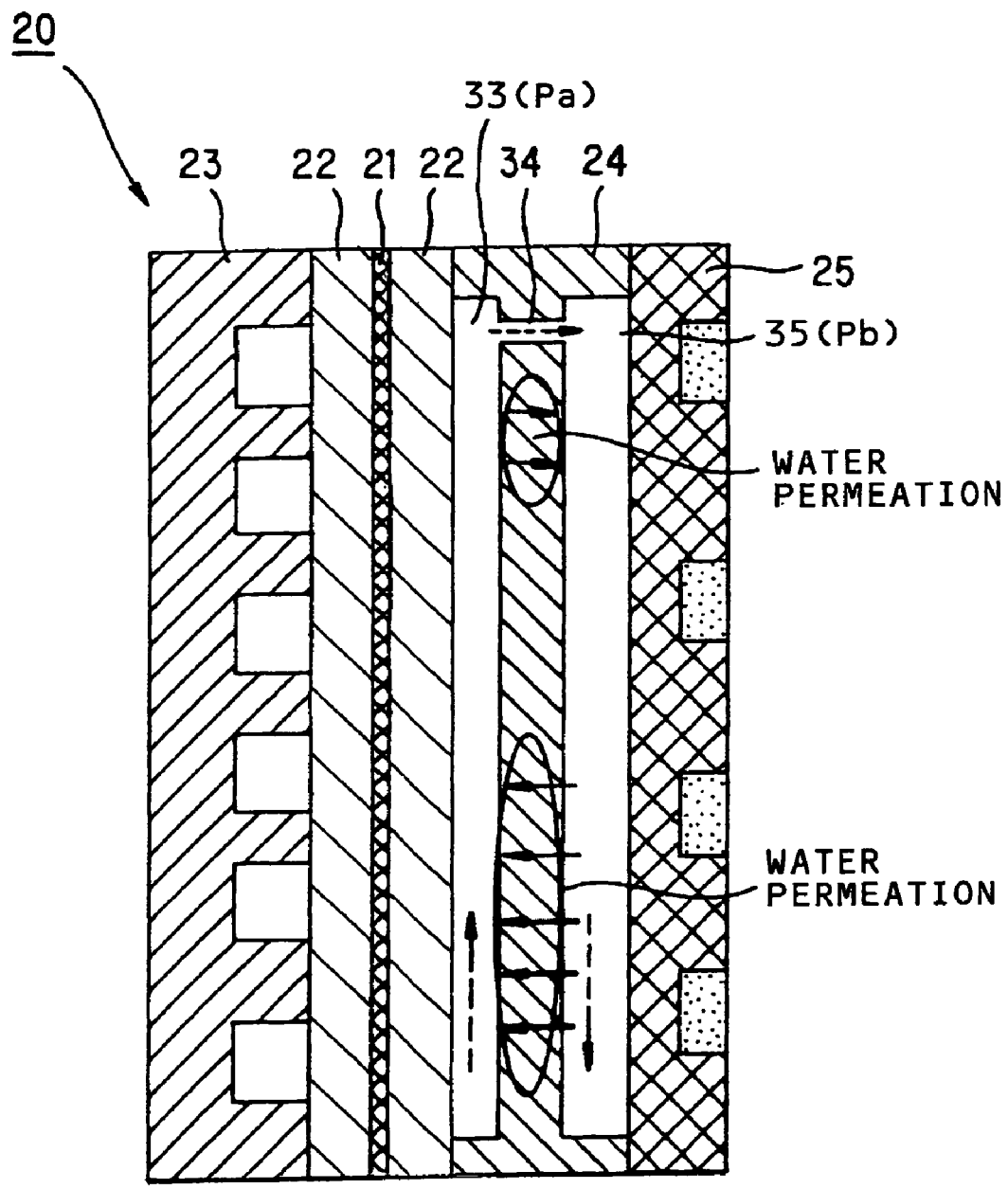
FIG. 5 is similar to FIG. 4, but showing a second embodiment of this invention.

FIG. 5 is a cross-sectional view of the fuel cell of the second embodiment, and corresponds to FIG. 4 of the first embodiment. The system construction is identical to that of the first embodiment shown in FIG. 1. In the description of the second and subsequent embodiments, the same symbols are assigned to the same constructional features as those of the first embodiment.

In the cell 20 of the second embodiment, the cross-sectional area of the connecting passages 34 is reduced. Due to this feature, a differential pressure arises between the gas pressure of the first gas passages 33 and the gas pressure of the second gas passages 35.

Specifically, the cross-sectional area of the connecting passages 34 of the cathode bipolar plate 24 is less than that of the first gas passages 33. As a result, a pressure loss occurs when gas flows through the connecting passages 34, and a gas pressure Pb of the second gas passages 35 becomes less than a gas pressure Pa of the first gas passages 33. For example, Pb is 10 kPa less than Pa.

Hence, the gas pressure Pa of the first gas passages 33 is higher than the gas pressure Pb of the second gas passages 35, so the water produced in the first gas passages 33 moves inside the cathode bipolar plate 24.

If the first gas passages 33 become flooded, gas diffusion is blocked, and the performance of the cell may decrease. However, according to the second embodiment, the water produced in the first gas passages 33 moves inside the cathode bipolar plate 24, so flooding in the first gas passages 33 is prevented, and performance decline of the fuel cell 11 is prevented. Also, the water taken into the cathode bipolar plate 24 vaporizes when there is insufficient moisture at the gas inlet 31, and humidifies the gas.

Hence, according to the second embodiment, the cross-sectional area of the connecting passages 34 is made smaller than the cross-sectional area of the first gas passages 33, so the gas pressure of the first gas passages 33 rises above the gas pressure of the second gas passages 35. Due to the pressure difference, if too much water condenses in the first gas passages 33, the condensed water can be discharged to the second gas passages 35 via the plate 24, flooding in the first gas passages 33 is prevented, and the moisture distribution in the cell is rendered uniform. Further, a differential pressure arises due to the pressure loss in the connecting passages 34, so there is no need to provide a complex pressure regulating mechanism in order to produce a differential pressure.

Embodiment 3

Figure 6:
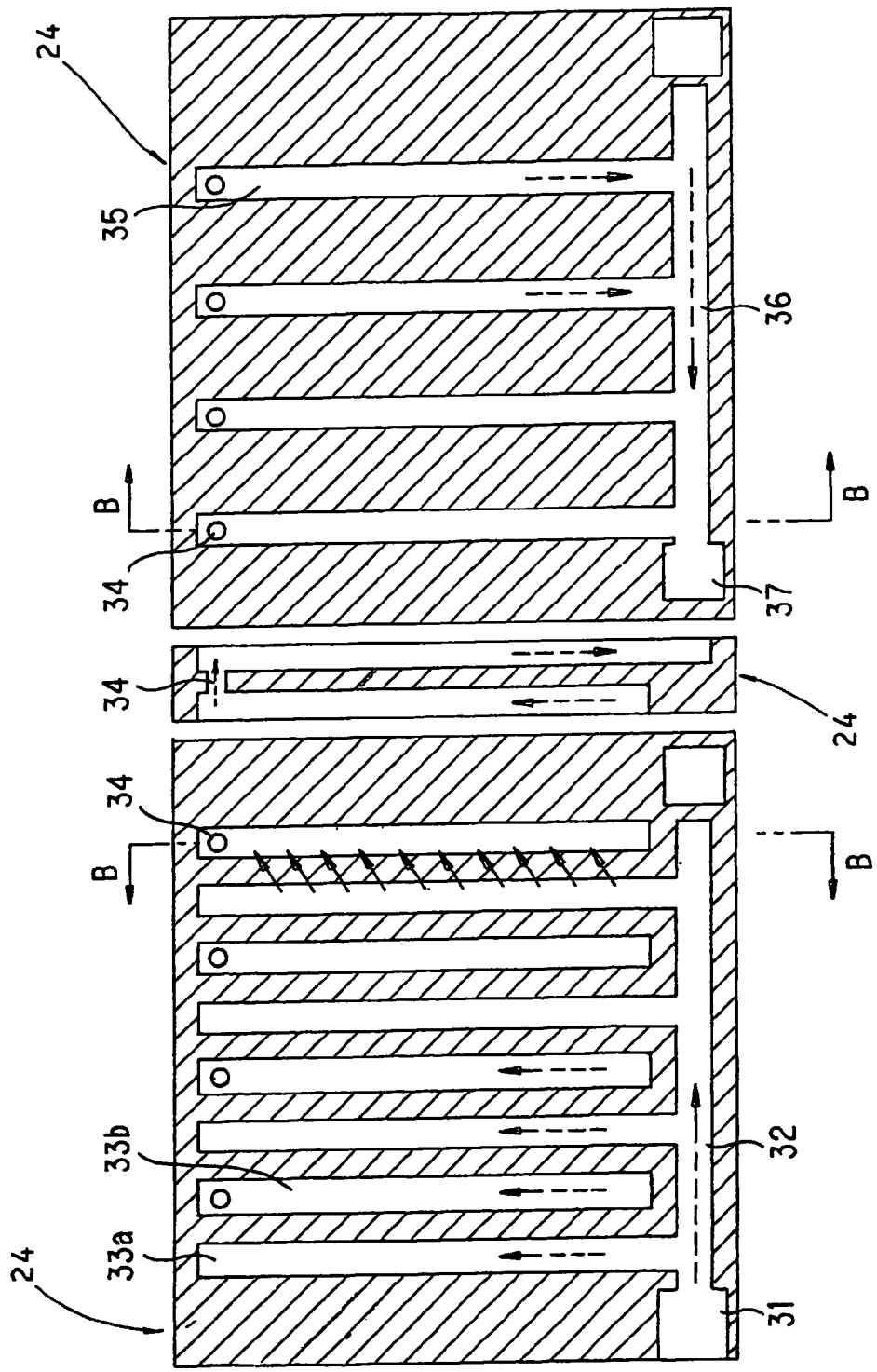
FIGS. 6A-6C are similar to FIGS. 3A-3C, but showing a third embodiment of this invention.

FIGS. 6A-6C show the passages of the cathode bipolar plate 24 according to the third embodiment. These figures correspond to FIGS. 3A-3C of the first embodiment. FIG. 6A is the top surface of the cathode bipolar plate 24, FIG. 6B is a section through a line B-B of FIG. 6A and FIG. 6B, and FIG. 6C is the undersurface of the cathode bipolar plate 24.

According to the third embodiment, the shape of the gas passages of the cathode bipolar plate 24 is different to that of the first embodiment. The system construction is identical to that of the first embodiment shown in FIG. 1.

According to the third embodiment, in the first gas passages 33 formed on the top surface of the cathode bipolar plate 24, gas moves through neighboring passages. Specifically, according to the third embodiment, the cathode bipolar plate 24 comprises two types of gas passages 33a, 33b on the top surface (FIG. 6A). The upstream gas passages 33a branch off from the gas inlet manifold 32, and their opposite ends are closed. The downstream gas passages 33b are formed between the upstream gas passages 33a, and are not connected to the gas inlet manifold 32. The downstream gas passages 33b communicate with the second gas passages 35 via the connecting passages 34.

Gas which has flowed in from the gas inlet manifold 32 to the upstream gas passages 33a moves to the adjacent downstream gas passages 33b via the porous gas diffusion layer 22.

Figure 7:
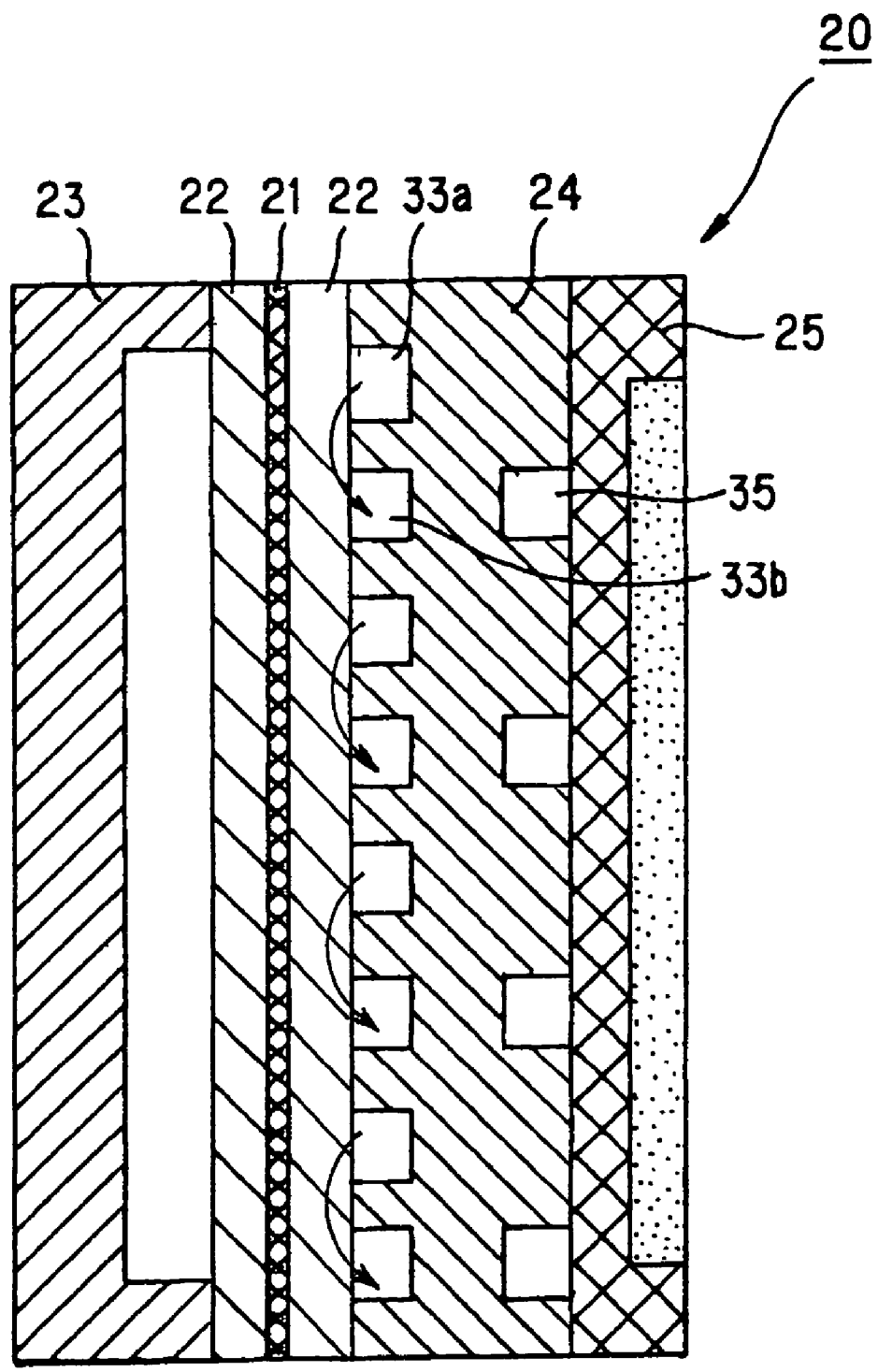
FIG. 7 shows a cross-section of a cell, showing the gas movement between the gas passages.

FIG. 7 shows movement of the gas from the upstream passages 33a to the downstream passages 33b. As shown in FIG. 7, gas which has moved from the upstream gas passages 33a to the downstream gas passages 33b passes through the gas diffusion layer 22. As a result, gas diffusion in the gas diffusion layer 22 is promoted, and the MEA 21 participates in the reaction over its whole surface. In addition, even if excess moisture is produced in the gas diffusion layer 22, this excess moisture is discharged when the gas passes through the gas diffusion layer 22, so gas diffusion is not easily obstructed by water.

In this way, according to the third embodiment, gas passes through the gas diffusion layer 22, so the reaction takes place over the whole surface of the MEA 21, gas diffusion is promoted, and the performance of the fuel cell 11 is enhanced.

Embodiment 4

Figure 8:
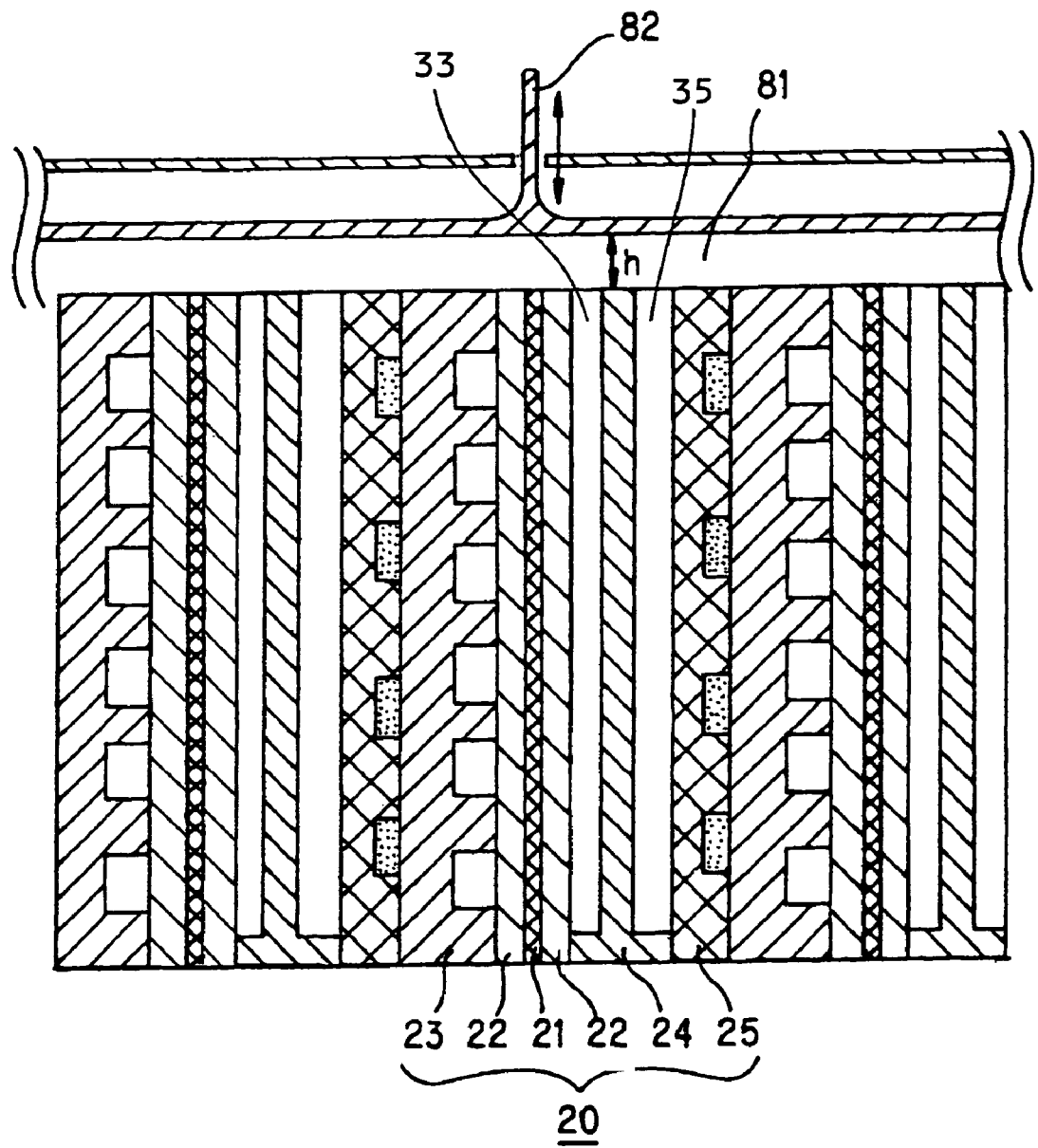
FIG. 8 is similar to FIG. 2, but showing a fourth embodiment of this invention.

FIG. 8 shows a cross-section of the fuel cell 11 according to the fourth embodiment, and corresponds to FIG. 2 of the first embodiment. The system construction is identical to that of the first embodiment shown in FIG. 1.

In the fourth embodiment, the communicating passage which connects the first gas passages 33 and second gas passages 35, is different from that of the first embodiment. The communicating passage of the fourth embodiment is an external manifold 81.

According to the fourth embodiment, the communicating manifold 81 is provided outside the cell 20 so that the first gas passages 33 communicate with the second gas passages 35. Also, in the communicating manifold 81, a differential pressure regulating mechanism 82 is provided which can regulate the differential pressure between the first gas passages 33 and second gas passages 35, by regulating the effective height h (volume) of the communicating manifold 81.

Figure 9:
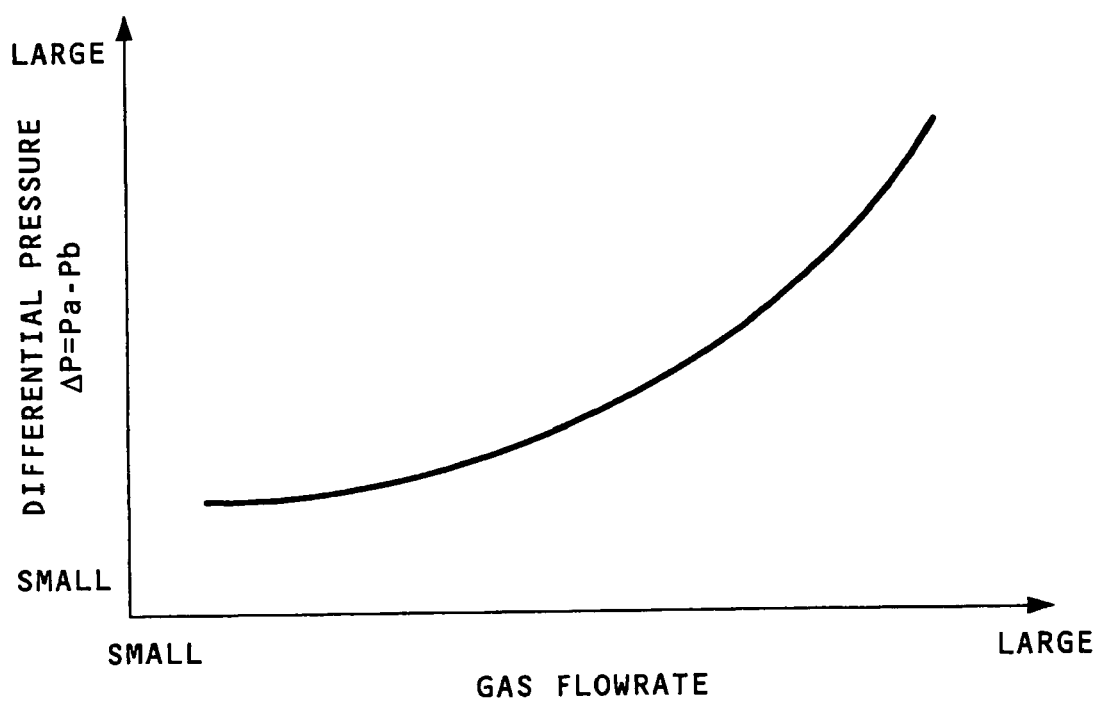
FIG. 9 is a characteristic diagram showing the relation between gas flowrate, and the differential pressure between the first gas passages and second gas passages, when throughholes are used as connecting passages between the first and second gas passages.

FIG. 9 shows the relation between the gas flowrate and the differential pressure between the first gas passages 33 and second gas passages 35, when a through-hole is used as the communicating passage as in the first embodiment. As the load of the fuel cell 11 increases, the gas flowrate increases, and the differential pressure between the first gas passages 33 and second gas passages 35 increases. Conversely, when the gas flowrate decreases, the differential pressure also decreases, and the effect of discharging the water in the first gas passages 33 decreases.

Figure 10:
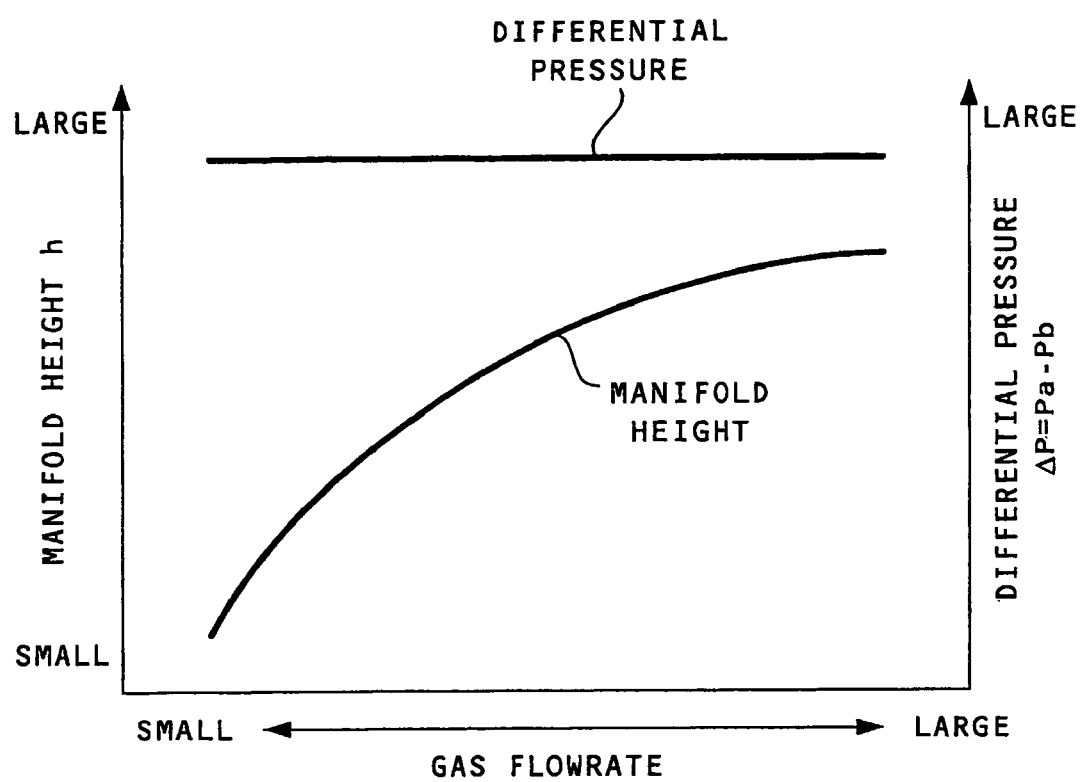
FIG. 10 is a characteristic diagram showing the relation between gas flowrate, effective height of a manifold and the differential pressure in the fourth embodiment.

FIG. 10 shows the relation between the gas flowrate, an effective height h of the communicating manifold 81, and a differential pressure $\Delta P(=Pa-Pb)$ in the fourth embodiment. As shown here, if the effective height h of the communicating manifold 81 is regulated by the differential pressure regulating mechanism 82, the differential pressure can be controlled. For example, when the gas flowrate has decreased, if the effective height h of the communicating manifold 81 is decreased, the differential pressure $\Delta P$ can be maintained constant. If the effective height h of the manifold 81 is suitably regulated according to the variation of gas flowrate, the differential pressure $\Delta P$ can be maintained constant.

In this way, according to the fourth embodiment, by regulating the pressure loss in the communicating manifold 81, the differential pressure between the first gas passages 33 and second gas passages 35 can be regulated, so the differential pressure of the gas between the first and second passages can be maintained constant regardless of gas flowrate, and flooding can be prevented regardless of the operating load of the fuel cell 11.

As it is unnecessary to form through-holes in the cathode bipolar plate 24, the construction of the plate 24 can be simplified. Further, after the gas containing water produced in the first gas passages 33 is rendered uniform in the communicating manifold 81, it can be introduced into the second gas passages 35.

Embodiment 5

Figure 11:
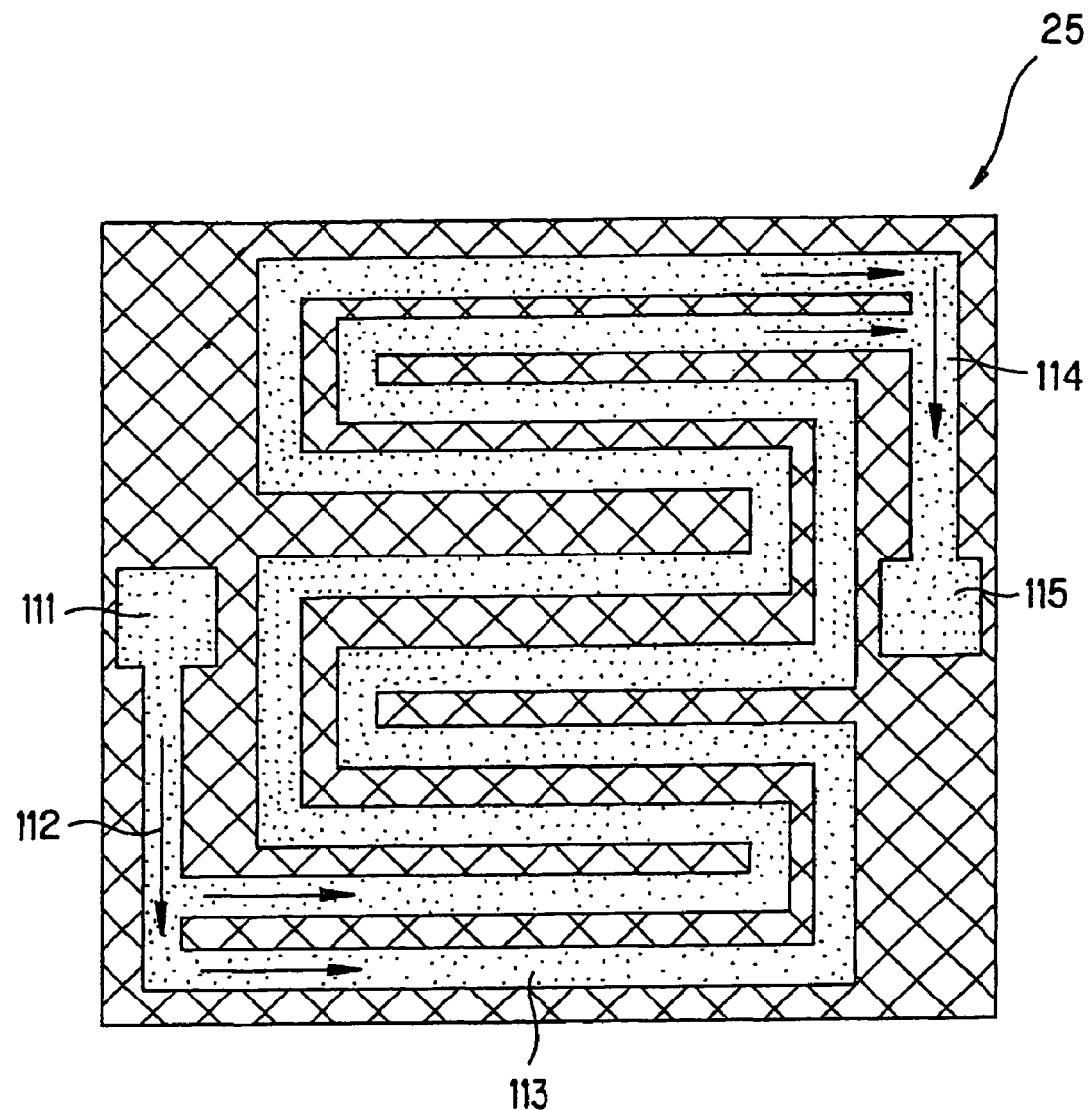
FIG. 11 is a diagram showing an LLC plate of a fifth embodiment of this invention.

FIG. 11 shows the LLC plate 25 of the fifth embodiment. The system construction and the passages of the cathode bipolar plate 24 are respectively identical to those of the first embodiment shown in FIG. 1, FIG. 2 and FIG. 3.

The fifth embodiment differs from the first embodiment in that the temperature of gas flowing in the gas passages 33, 35 is varied according to the position in the passages, and that the gas temperature at the gas outlet and gas temperature gradient in the gas passages (difference between the upstream gas temperature and downstream gas temperature) are controlled so that the water amount produced in the fuel cell 11 balances the water amount delivered outside the fuel cell 11. The gas temperature at the gas outlet and the gas temperature gradient in the gas passages are controlled by controlling the LLC inlet temperature and LLC temperature gradient (difference between LLC inlet temperature and outlet temperature).

The LLC passage 113 formed in the LLC plate 25 is a serpentine type. After the LLC flowing in from an LLC inlet 111 passes through an LLC inlet manifold 112, it branches off to LLC passages 113. Subsequently, it is combined in an LLC outlet manifold 114, and is discharged from an LLC outlet 115. The LLC absorbs heat from the adjacent cathode bipolar plate 24, and the temperature increases as it flows from the LLC inlet 111 to the LLC outlet 115. Considering the relation between the gas passages 33, 35 shown in FIG. 3, in the first gas passages 33, the gas temperature increases from the gas inlet 31, the nearer the communicating passages 34 (the further downstream), and in the second gas passages 35, the temperature decreases from the communicating passages 34, the nearer the gas outlet 37 (the further downstream).

Figure 12:
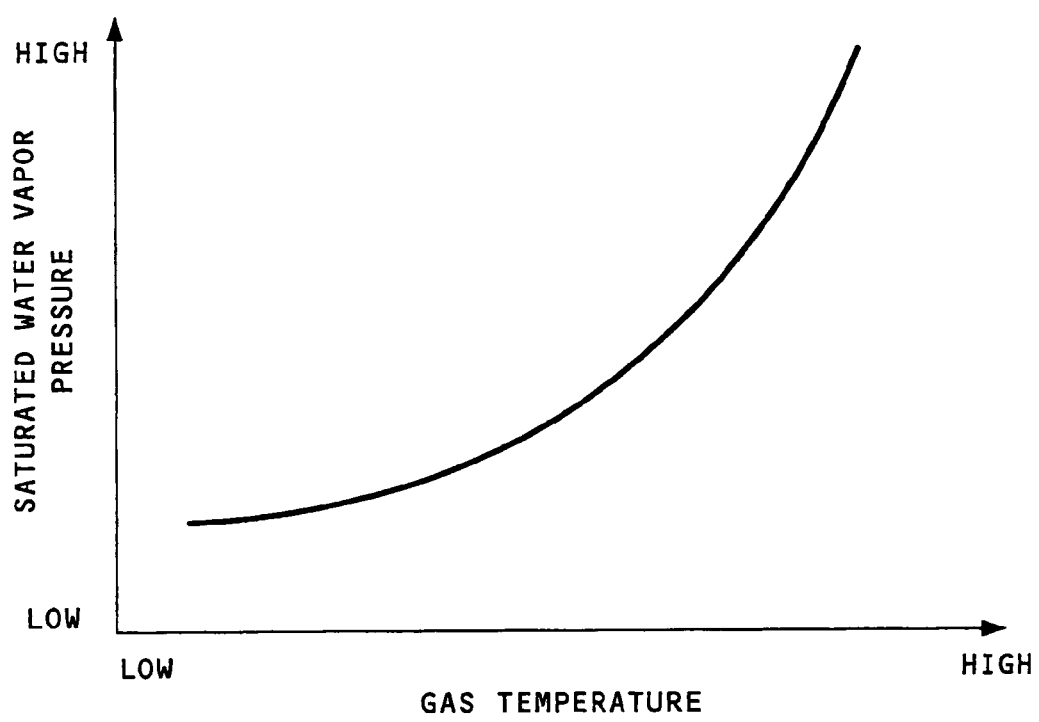
FIG. 12 is a characteristic diagram showing a relation between temperature and saturated water vapor pressure.

FIG. 12 shows a relation between gas temperature and saturated water vapor pressure. As the gas temperature increases, the saturated water vapor pressure sharply increases. This means that if the gas temperature increases, the amount of vapor which the gas can hold also increases. Conversely, if the temperature decreases, the gas can no longer hold water in the vapor state, and water condenses to liquid.

Figure 13:
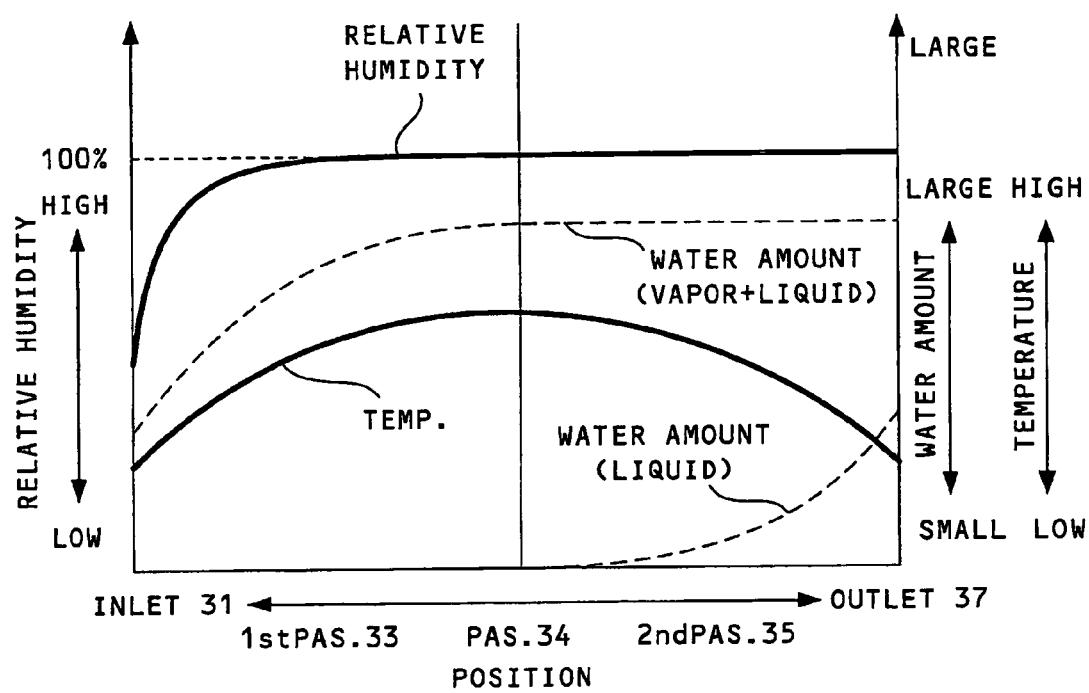
FIG. 13 is a characteristic diagram showing a relation between position in the gas passages, relative humidity, water amount and temperature.

FIG. 13 shows the relation between position in the gas passages 33, 35, relative humidity, water amount and temperature. In the first gas passages 33, the gas temperature increases from the gas inlet 31, the nearer to the communicating passages 34. As a result, even if water is produced by the reaction, the relative humidity of the gas does not exceed 100% and there is no saturation, so water does not condense, and in the first gas passages 33, there is no flooding.

On the other hand, in the second gas passages 35, the gas temperature decreases from the communicating passages 34, the nearer to the gas outlet 37. As a result, the water amount increases beyond the saturation water amount, and the relative humidity always exceeds 100%, so the water which exceeds saturation amount condenses, and liquefies. However, as the cathode bipolar plate 24 is porous, the liquefied water moves through the plate 24 into the first gas passages 33, and is used for humidifying the gas.

In this way, according to the fifth embodiment, by varying the temperature of the gas flowing through the gas passages 33, 35 according to the position in the passages, flooding in the first gas passages 33 is prevented. Further, blocking of the passage due to flooding of the second gas passage 35 is prevented, and drying of the gas flowing from the inlet 31 of the cathode bipolar plate 24 is also prevented.

Further, in the fifth embodiment, the LLC recycling amount and the heat radiation amount of the radiator 18 are regulated to maintain a water balance in the fuel cell 11, and the temperature and temperature gradient of the gas flowing through the gas passages 33, 35, are regulated.

Figure 14:
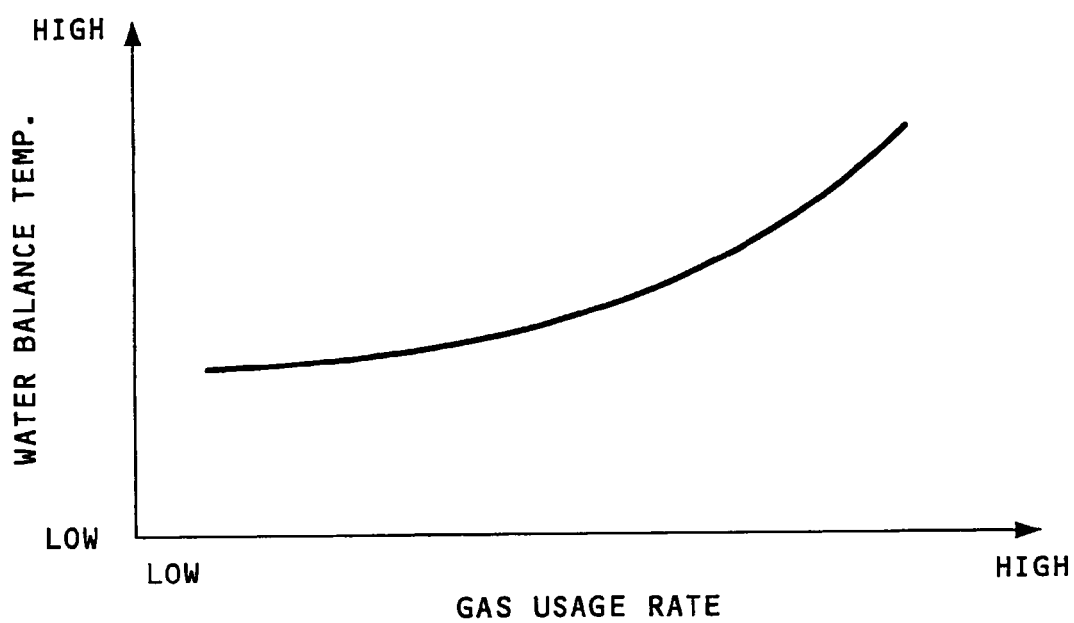
FIG. 14 is a characteristic diagram showing a relation between gas usage rate and water balance temperature when the gas pressure of the fuel cell is constant.

FIG. 14 shows a relation between the gas usage rate and the water balance temperature when the gas pressure in the fuel cell 11 is maintained constant. The water balance temperature refers to the temperature of the gas at the gas outlet 37 when the water balance is established. In the fuel cell 11, water is produced by the reaction and gas containing this water as water vapor is discharged. Therefore, for example, when there is no humidifier upstream of the fuel cell 11 and dry gas flows into the fuel cell 11, if the gas temperature discharged from the fuel cell 11 is high, water in excess of the produced water is removed from the system by the discharged gas, water in the fuel cell 11 decreases and dryout occurs.

To avoid dryout, the water produced in the fuel cell 11 must be balanced with the water taken out of the fuel cell 11. If there is no water balance in the fuel cell 11, a water recovery device must be installed downstream of the fuel cell 11 to recover water, which is then used to humidify the gas flowing into the fuel cell 11.

When the gas pressure in the fuel cell 11 is constant, the water balance temperature is determined by the gas usage rate in the fuel cell 11, as shown in FIG. 14. When the gas usage rate is high, the discharged gas amount decreases, so the water amount taken out of the fuel cell by the gas decreases, and the water balance temperature increases. Conversely, when the gas usage amount is small, the discharged gas amount increases, the water amount taken out by the gas increases, and the water balance temperature decreases.

Figure 15:
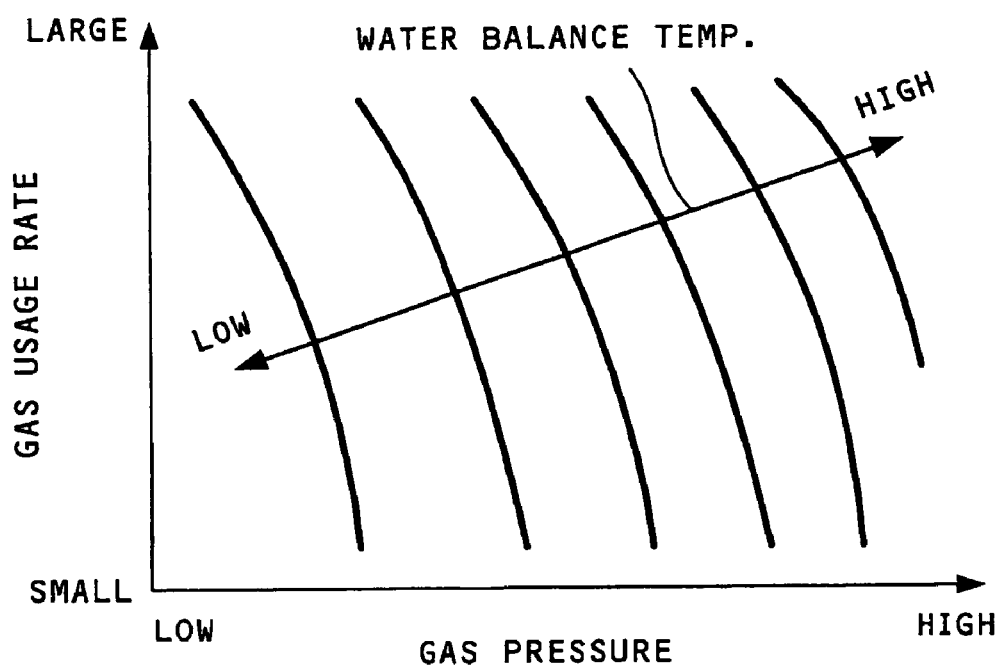
FIG. 15 is a characteristic diagram showing a relation between gas pressure, gas usage rate and water balance temperature.

FIG. 15 shows a relation between the pressure of the gas supplied to the fuel cell 11, the gas usage rate and the water balance temperature. The higher the gas pressure is, the smaller the water amount taken out of the fuel cell by the gas, so the water balance temperature increases. The water balance temperature required to establish the water balance can be calculated for a certain gas pressure and gas usage rate by referring to FIG. 15.

In order to establish the water balance in the fuel cell 11 at a certain gas pressure and gas usage rate, the gas temperature (gas outlet temperature) at the gas outlet 37 of the fuel cell 11 must be cooled to a certain temperature by LLC. Consequently, according to the fifth embodiment, the gas outlet temperature is decreased by LLC flowing through the LLC passage 113 of the LLC plate 25. The gas outlet temperature cannot be cooled below the LLC inlet temperature, so the LLC inlet temperature must be set lower than the water balance temperature.

The LLC inlet temperature required to make the gas outlet temperature equal to the water balance temperature, is determined by the specification of the fuel cell 11, e.g. the thermal conductivity and shape of passages, so the relation between gas outlet temperature and LLC inlet temperature is first found, and this is used for the calculation.

If the gas pressure and gas usage rate are determined, the gas temperature at the gas outlet 37 required to establish the water balance, i.e., the water balance temperature is determined, and the LLC inlet temperature required to realize this water balance temperature is determined.

Also, to prevent flooding midway in the passages, the temperature midway in the passages must also be controlled. According to the fifth embodiment, the gas temperature in the communicating passages 34 connecting the gas passages 33, 35, is controlled. To control the gas temperature in the communicating passages 34, the LLC target temperature at the LLC outlet 15 disposed in the vicinity of the communicating passages 34, is determined, and the target LLC temperature gradient is determined.

Figure 16:
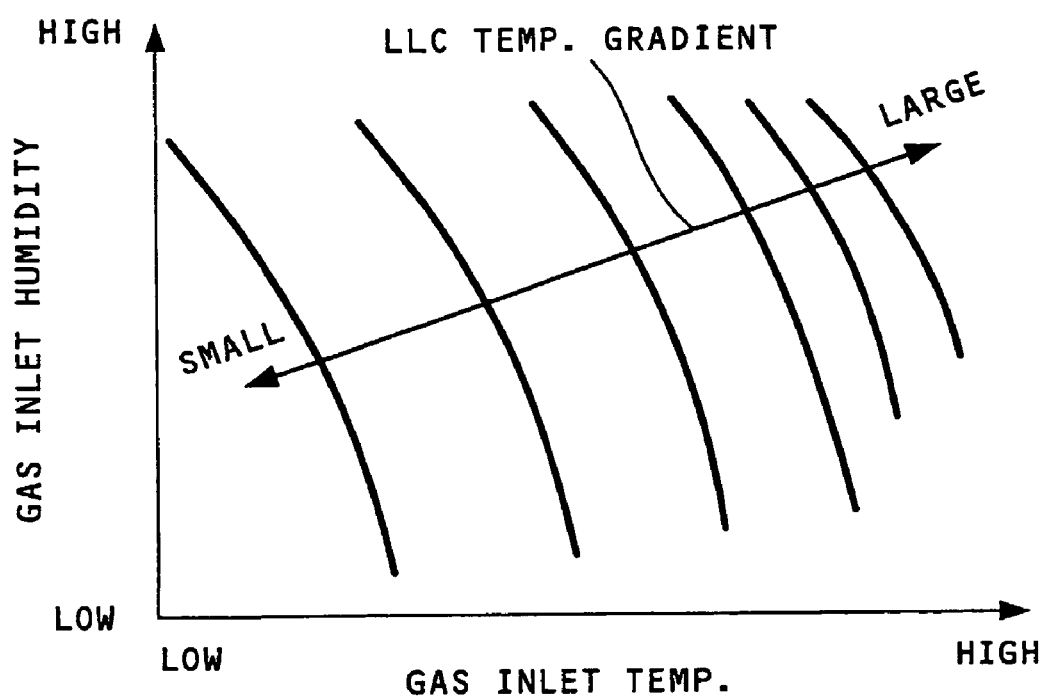
FIG. 16 is a characteristic diagram showing a relation between gas inlet temperature, gas inlet humidity and LLC temperature gradient.

FIG. 16 shows a relation between gas inlet temperature, gas inlet humidity and LLC temperature gradient. The LLC temperature gradient is increased the higher the gas inlet temperature is, and the higher the gas inlet humidity is, and if the temperature gradient of the gas flowing in the gas passages 33, 35 is increased, flooding can be prevented even if the external conditions change.

Figure 17:
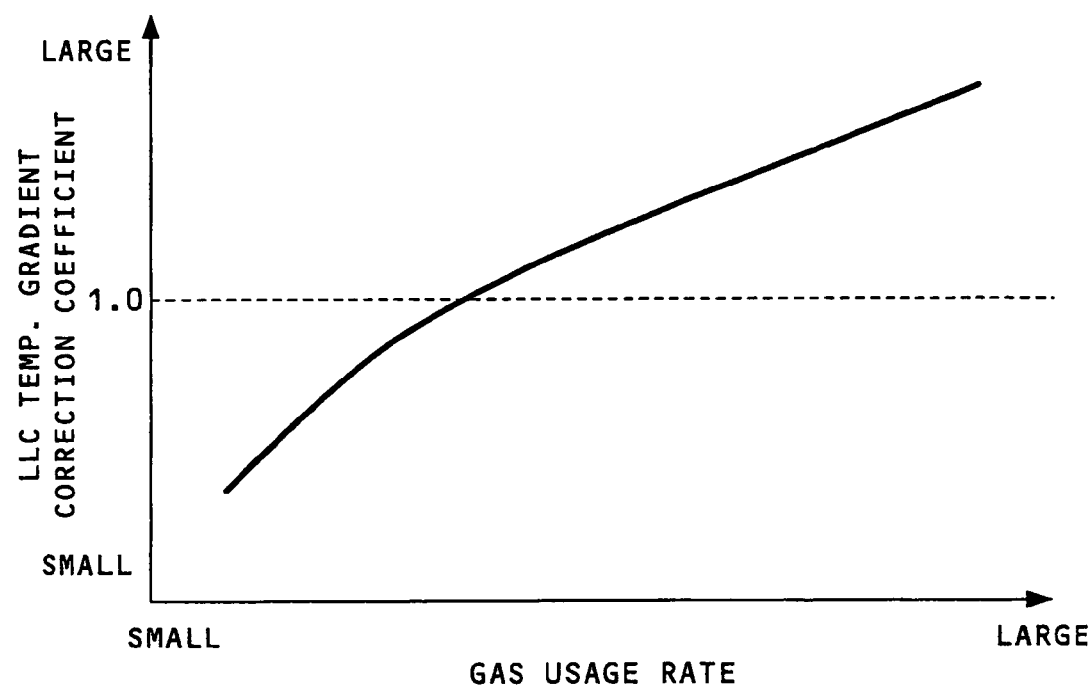
FIG. 17 is a characteristic diagram showing a relation between gas usage rate and LLC temperature gradient correction coefficient.

FIG. 16 shows the case where the gas usage rate is fixed, but in practice the gas usage rate varies, and a correction is necessary. FIG. 17 shows a relation between the gas usage rate and an LLC temperature gradient correction coefficient. The smaller the gas usage rate is, the larger the water amount which can be held in the vapor phase, so the gas temperature gradient can be reduced. Conversely, if the gas usage rate is large, the water amount which can be held in the vapor phase decreases, so a large gas temperature gradient is required. For this purpose, the LLC temperature gradient is corrected by the LLC temperature gradient correction coefficient obtained by referring to FIG. 17.

Figure 18:
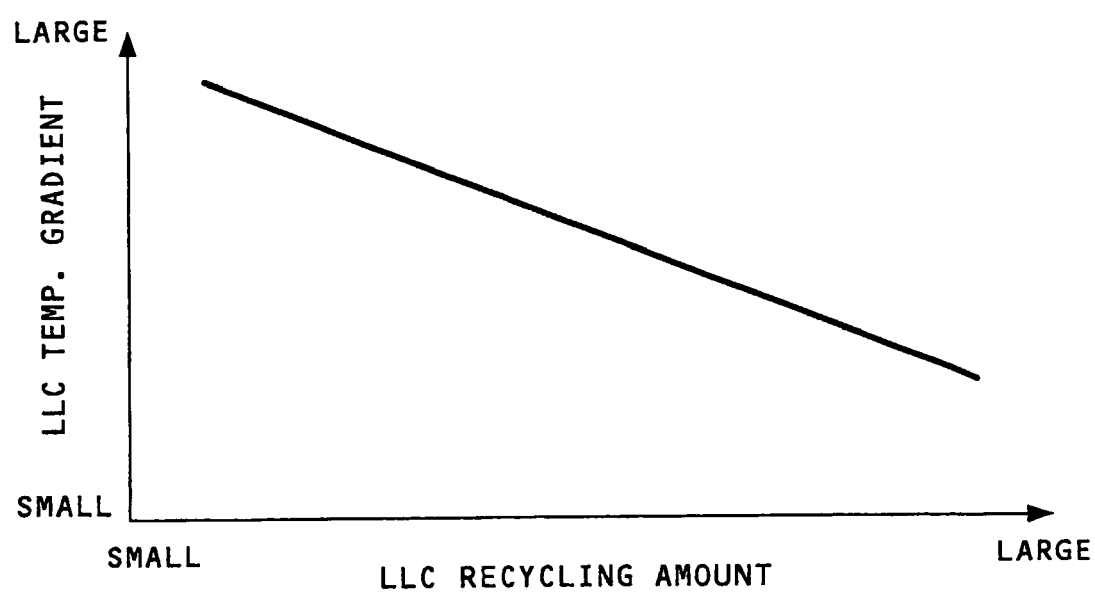
FIG. 18 is a characteristic diagram showing a relation between LLC recycling amount flowing in an LLC passage, and LLC temperature gradient in the fuel cell.

FIG. 18 shows a relation between a LLC recycling amount flowing through the LLC passages and the LLC temperature gradient in the LLC plate 25. By referring to FIG. 18, the LLC recycling amount required to achieve the target LLC temperature gradient can be determined. The smaller the LLC recycling amount is, the larger the LLC temperature gradient can be set. In other words, the smaller the LLC recycling amount is, the larger the difference between the LLC temperature at the inlet 111 and LLC temperature at the outlet 115, and the larger the LLC recycling amount is, the smaller the difference between the LLC temperature at the inlet 111 and LLC temperature at the outlet 115.

Figure 19:
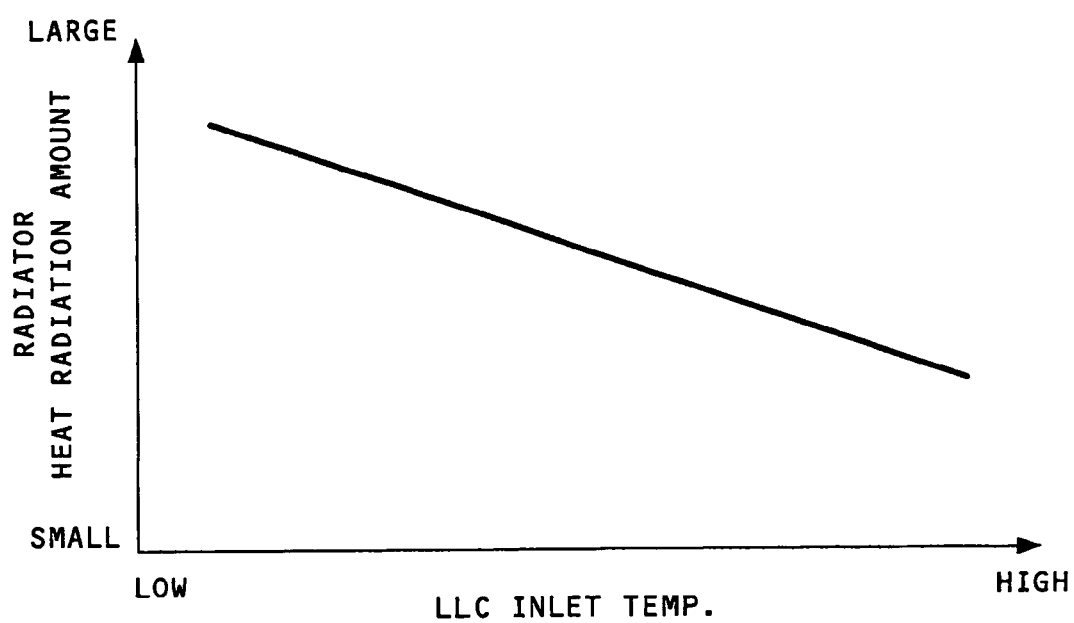
FIG. 19 is a characteristic diagram showing a relation between LLC inlet temperature and radiator heat radiation amount.

FIG. 19 shows a relation between the LLC inlet temperature and radiator heat radiation amount. By referring to FIG. 19, the radiator heat radiation amount required to make the LLC inlet temperature the target temperature, can be calculated.

Figure 20:
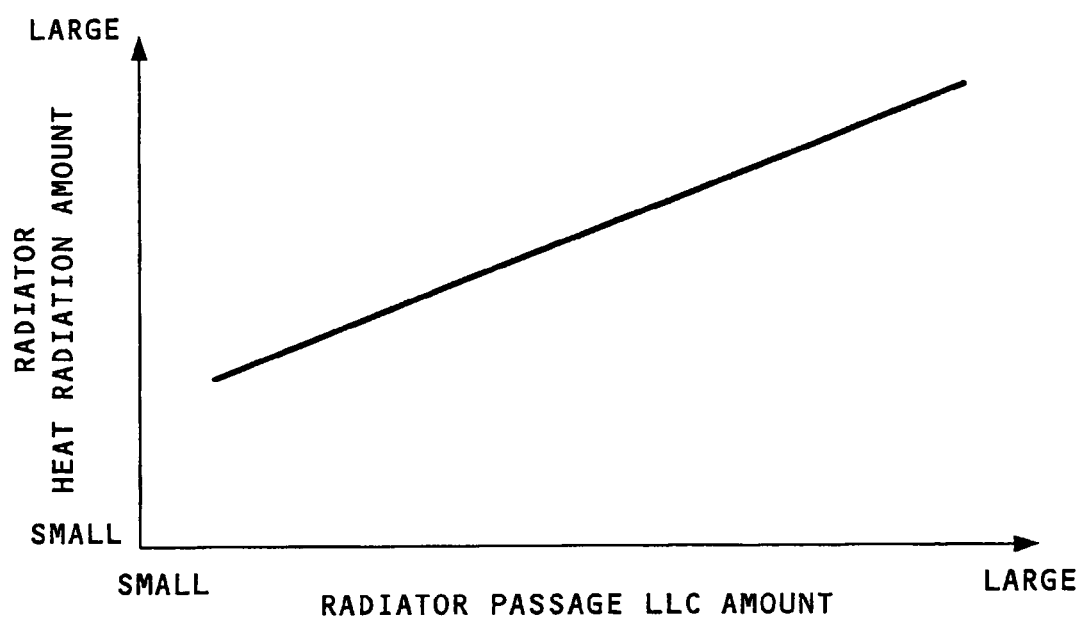
FIG. 20 is a characteristic diagram showing a relation between LLC amount passing through the radiator and heat radiation amount radiated by the radiator when the outside air temperature is constant.

FIG. 20 shows a relation between the LLC amount passing through the radiator 18 and the heat radiation amount radiated by the radiator 18 when the outside air temperature is maintained constant. In the system shown in FIG. 1, the larger the LLC amount bypassing the radiator 18 is, and the smaller the LLC amount flowing through the radiator 18 is, the smaller the heat radiation amount of the radiator 18. Conversely, the smaller the LLC amount bypassing the radiator 18 is, and the larger the LLC amount flowing through the radiator 18 is, the larger the heat radiation amount of the radiator 18. Therefore, the heat radiation amount from the radiator 18 can be controlled by controlling the LLC amount flowing through the radiator 18.

Figure 21:
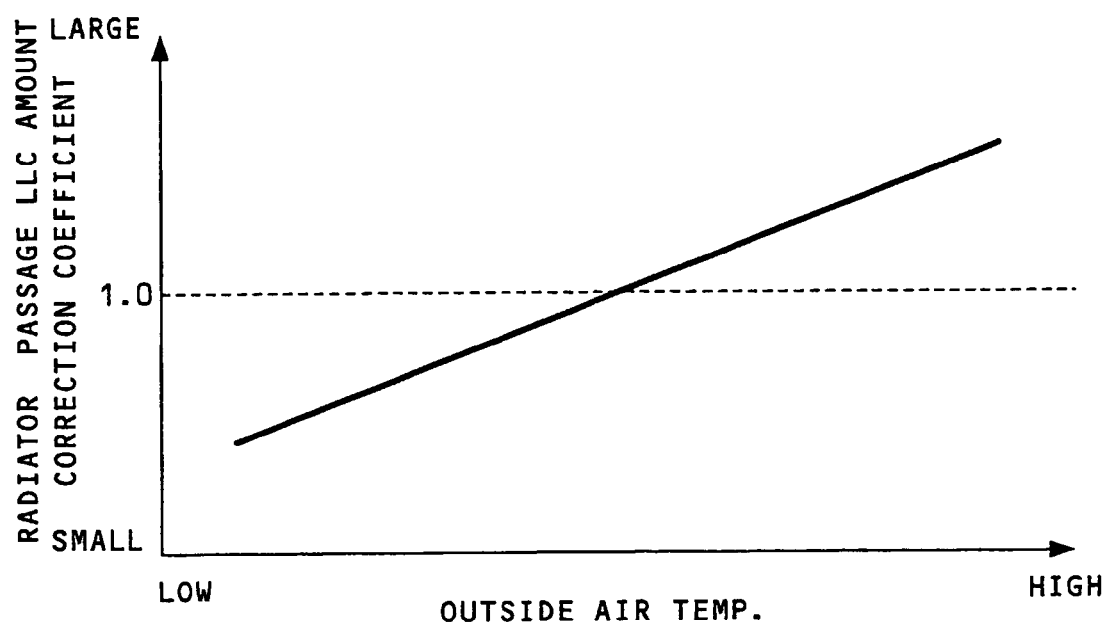
FIG. 21 is a characteristic diagram showing a relation between outside air temperature and radiator passage LLC amount correction coefficient.

The heat radiation amount of the radiator varies depending on the outside air temperature, so the LLC amount passing through the radiator is corrected according to the outside air temperature. FIG. 21 shows a relation between the outside air temperature and a radiator LLC amount correction coefficient. The LLC amount flowing through the radiator 18 must be corrected by the correction coefficient found in FIG. 21.

Figure 22:
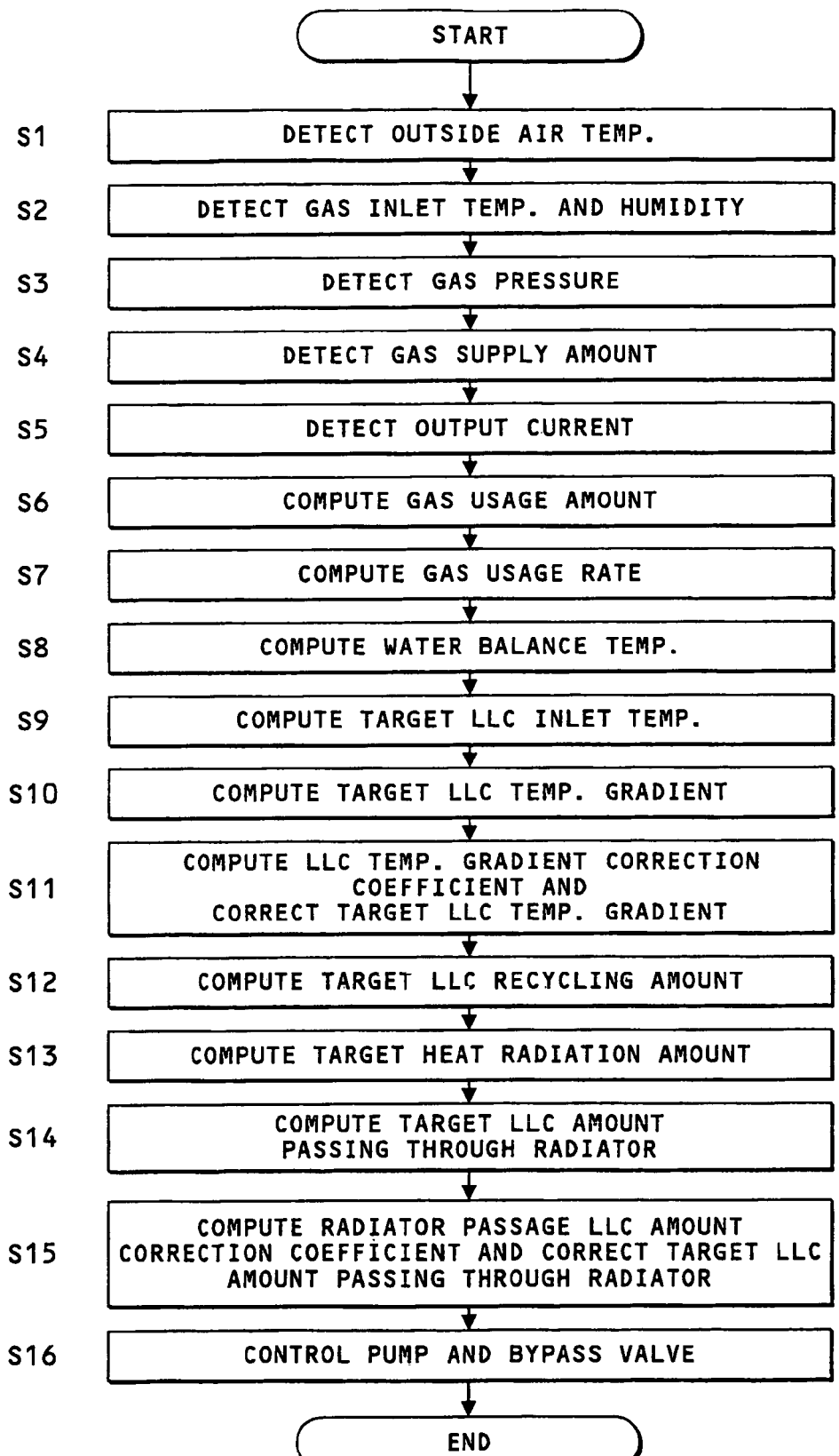
FIG. 22 is a flowchart showing the control performed by a controller.

The control performed by the controller 10 according to the fifth embodiment will now be described in view of the above points. FIG. 22 shows the control performed by the controller 10.

First, in a step S1, the outside air temperature is detected by the outside air temperature sensor 9.

In a step S2, the gas temperature and humidity at the gas inlet 31 are respectively detected by the temperature sensor 12 and humidity sensor 13.

In a step S3, the gas pressure at the gas inlet 31 is detected by the pressure sensor 8. The gas pressure can also be estimated from the opening of a valve which controls the fuel gas supply.

In a step S4, the gas supply amount to the fuel cell 11 is detected by the flowrate sensor 7. The gas supply amount may also be calculated from the output of a blower.

In a step S5, an output current of the fuel cell 11 is detected by the ammeter 6.

In a step S6, a gas usage amount of the fuel cell 11 is computed based on the reaction equations and the output current detected in the step S5.

In a step S7, the gas usage rate of the fuel cell 11 is computed. Specifically, the gas usage rate is computed by dividing the gas usage amount calculated in the step S6 by the gas supply amount detected in the step S4.

In a step S8, the water balance temperature is computed referring to FIG. 15 from the gas pressure detected in the step S3 and gas usage rate computed in the step S7.

In a step S9, the target LLC inlet temperature is computed from the specification of the fuel cell 11 and the water balance temperature computed in the step S8.

In a step S10, the target LLC temperature gradient is computed referring to FIG. 16, based on the gas temperature and humidity at the gas inlet 31 detected in the step S2.

In a step S11, the LLC temperature gradient correction coefficient is computed referring to FIG. 17 based on the gas usage rate computed in the step S7, and the target LLC temperature gradient computed in the step S10 is thereby corrected.

In a step S12, the LLC recycling amount is computed referring to FIG. 18 based on the target LLC temperature gradient corrected in the step S11.

In a step S13, the target heat radiation amount of the radiator 18 is computed referring to FIG. 19 based on the target LLC inlet temperature computed in the step S9.

In a step S14, the LLC amount passing through the radiator 18 is computed referring to FIG. 20 based on the target radiator heat radiation amount computed in the step S13.

In a step S15, the radiator passage LLC amount correction coefficient is computed referring to FIG. 21 based on the outside air temperature detected in the step S1, and the target LLC amount passing through the radiator 18 is corrected using the radiator passage LLC amount correction coefficient computed in the step S14.

In a step S16, the output of the pump 15 and opening of the bypass valve 19 are controlled so that the target LLC amount passing through the radiator 18 corrected in the step S15, is realized.

According to the fifth embodiment, the LLC recycling amount and heat amount from the radiator 18 are controlled, and the LLC temperature at the LLC inlet 111 and LLC temperature gradient in the LLC plate 25, are controlled.

As a result, the heat radiation amount from the radiator 18 increases, the LLC temperature decreases and the temperature of the gas discharged from the gas outlet 37 decreases, the lower the gas pressure and gas usage rate of the fuel cell 11 are. Also, the LLC recycling amount decreases, the LLC temperature gradient in the LLC in the LLC plate 25 increases, and the temperature gradient of the gas flowing through the gas passages 33, 35 increases, the higher the gas temperature and humidity at the gas inlet 31 are. Due to this, flooding in the passages can be prevented, and the water balance in the fuel cell 11 can be established.

Embodiment 6

Figure 23:
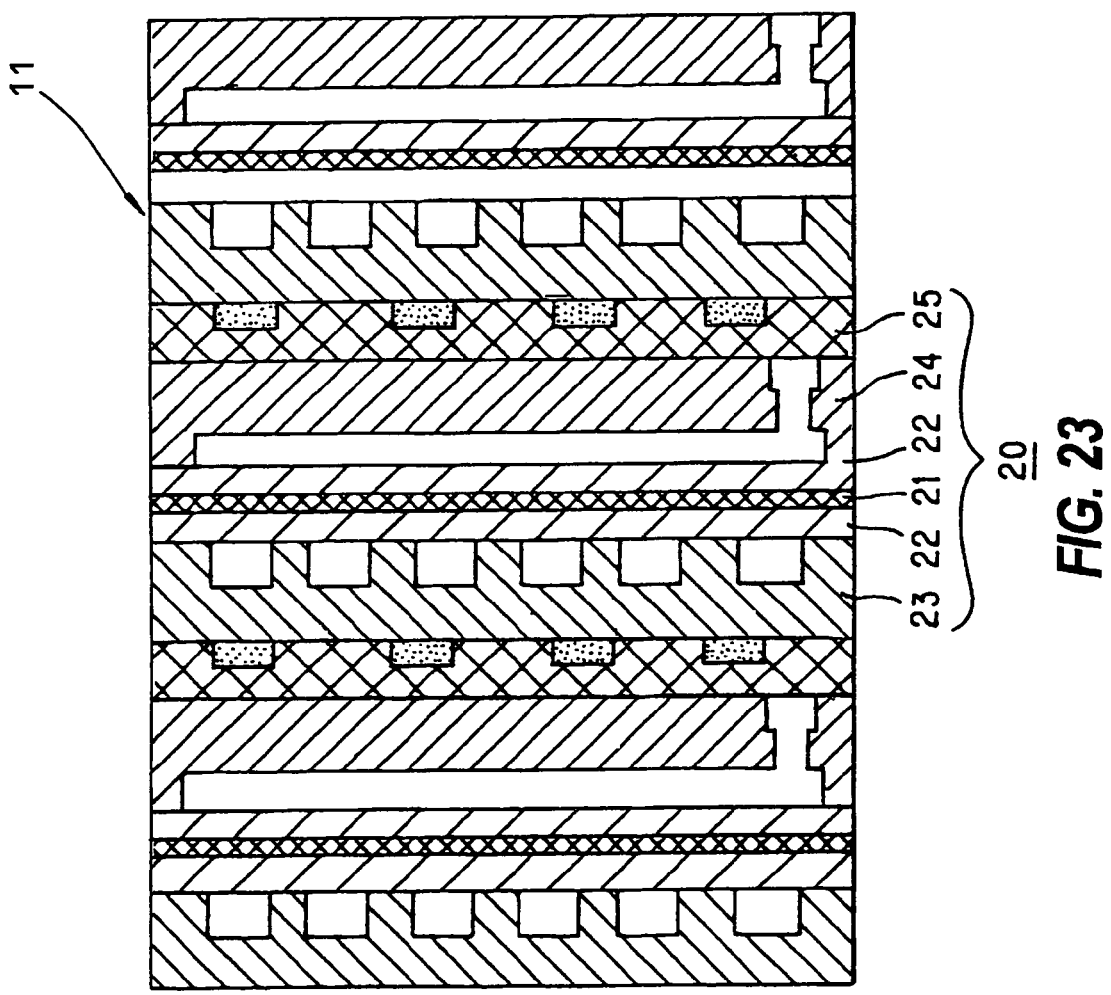
FIG. 23 is similar to FIG. 2, but showing a sixth embodiment of this invention.

FIG. 23 shows a cross-section of the fuel cell 11 according to the sixth embodiment. The system construction is identical to that of the first embodiment shown in FIG. 1. In the sixth embodiment, the bipolar plate is a solid which does not pass water, and gas passages are formed so that the water balance is established.

The cell 20 comprises the MEA 21, gas diffusion layer 22, anode bipolar plate 23, cathode bipolar plate 24 and LLC plate 25. Both the anode bipolar plate 23 and cathode bipolar plate 24 are solid.

Figure 24:
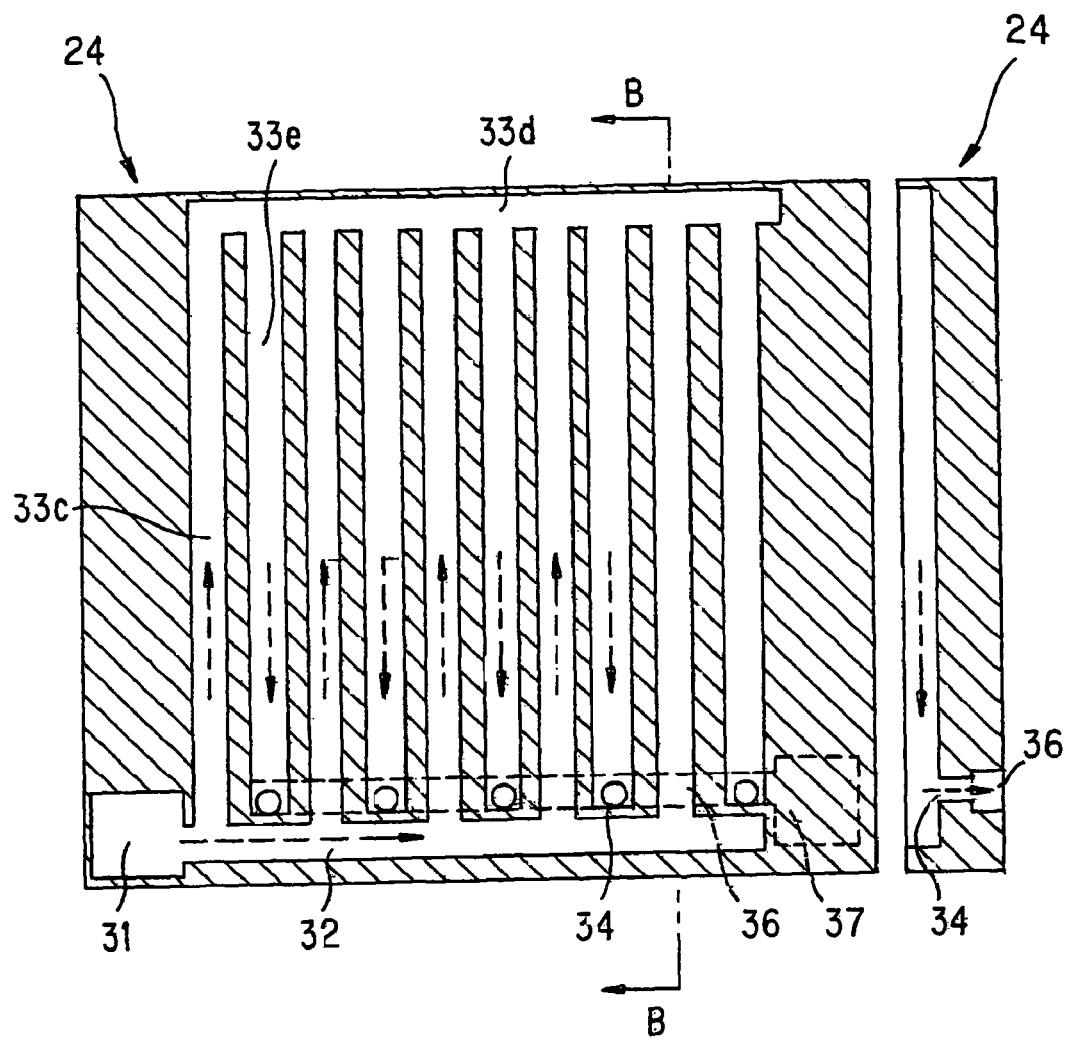
FIGS. 24A, 24B are similar to FIGS. 3A, 3B, but showing a cathode bipolar plate according to the sixth embodiment.

FIGS. 24A and 24B show the cathode bipolar plate 24 according to the sixth embodiment. FIG. 24A is the top surface, and FIG. 24B is a cross-section through the line B-B in FIG. 24A.

First gas passages 33c whereof one end of each is connected to the gas inlet 31 and the other end of each is connected to a return part 33d, and second gas passages 33e formed parallel to the first gas passages 33c whereof one end of each is connected to the first gas passages 33c via the return part 33d and the other end of each is connected to the gas outlet 37, are formed on the surface of the cathode bipolar plate 24.

Gas is supplied from the gas inlet 31, passes through the gas inlet manifold 32, branches off to the first gas passages 33c, returns via the return part 33d, and flows into the second gas passages 33e. Subsequently, this gas passes through the communicating passages 34, is combined at the gas outlet manifold 36 formed on the undersurface of the cathode bipolar plate 24, and is discharged from the gas outlet 37.

Figure 25:
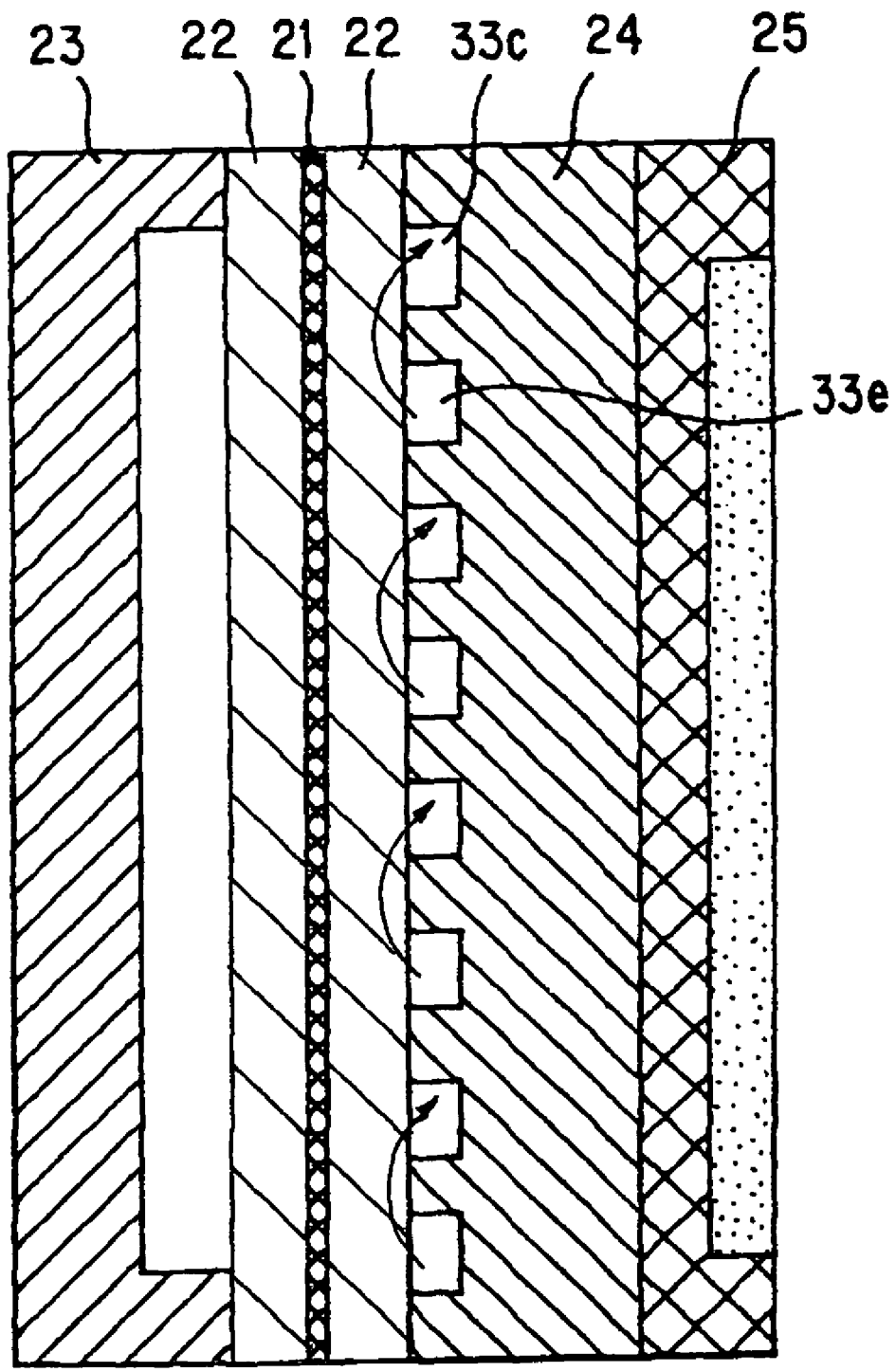
FIG. 25 is a cross-section of the cell, showing the movement of water between the gas passages according to the sixth embodiment.

FIG. 25 shows the movement of water between the passages according to the sixth embodiment. As water cannot pass through the solid plate 24, water produced in the first gas passages 33e passes through the gas diffusion layer 22, and returns to the second gas passages 33c.

The passages in the LLC plate 25 are identical to the passages shown in FIG. 11. Therefore, in the gas passages of the cathode bipolar plate 24 shown in FIGS. 24A and 24B, the gas flowing through the gas inlet manifold 32 and the gas outlet manifold 36 near the LLC passage inlet 111 is at low temperature, whereas the gas flowing through the return part 33d near the LLC outlet 115 is at high temperature. Therefore, in the first gas passages 33c, the gas temperature increases further downstream, and water produced by the reaction becomes incorporated in the gas due to the rise of water vapor pressure.

In the second gas passages 33e whereof the temperature falls further downstream, water is produced by the drop of saturated water vapor pressure. However, as shown in FIGS. 24A and 24B, the first gas passages 33c are parallel and adjacent to the second gas passages 33e, so water produced in the second gas passages 33e passes through the porous gas diffusion layer 22, and moves into the first gas passages 33c where water is insufficient as shown in FIG. 25.

Further, in an identical way to that of the fifth embodiment, the controller 10 controls the LLC temperature and temperature gradient according to the flowchart shown in FIG. 22 so as to establish the water balance in the fuel cell 11.

According to the sixth embodiment, even when a solid plate is used for the bipolar plate, flooding in the passages can be prevented, and the water balance in the fuel cell 11 can be established.

The entire contents of Japanese Patent Application P2002-192912 (filed Jul. 2, 2002) are incorporated herein by reference.

Although the invention has been described above by reference to certain embodiments of the invention, the invention is not limited to the embodiments described above. Modifications and variations of the embodiments described above will occur to those skilled in the art, in the light of the above teachings. The scope of the invention is defined with reference to the following claims.

INDUSTRIAL FIELD OF APPLICATION

This invention may be widely applied to polymer electrolyte fuel cells. In a polymer electrolyte fuel cell according to this invention, flooding and dryout are prevented, which helps to prevent a decline in the performance of the fuel cell.

The invention claimed is:

1. A fuel cell, comprising:
a membrane electrode assembly, and
a bipolar plate having first and second opposing sides disposed outside the membrane electrode assembly, wherein:
the bipolar plate is porous, and comprises:
a first gas passage formed on a surface on the first side of the bipolar plate facing the membrane electrode assembly,
a second gas passage formed on another surface on the second side of the bipolar plate,
a communicating passage which allows the first gas passage and second gas passage to communicate with each other, a gas inlet for introducing gas connected to one of the first gas passage and second gas passage, and a gas outlet for discharging gas connected to the other of the first gas passage and second gas passage.

2. The fuel cell as defined in claim 1, wherein:

the gas inlet is connected to the first gas passage, the gas outlet is connected to the second gas passage, and gas introduced from the gas inlet flows through the first gas passage, communicating passage and second gas passage in that order, and is discharged from the gas outlet.

3. The fuel cell as defined in claim 2, wherein:

the second gas passage is formed on the second side of the bipolar plate so that the second gas passage is back-to-back with the first gas passage, and the gas outlet is formed on the opposite side of the gas inlet so that the gas outlet is underneath the gas inlet.

4. The fuel cell as defined in claim 2, wherein the first gas passage comprises:

an upstream gas passage whereof one end is connected to the gas inlet and the other end is closed, and a downstream gas passage whereof one end is closed and the other end is connected to the communicating passage.

5. The fuel cell as defined in claim 2, wherein:

the pressure of the gas flowing through the first gas passage is higher than the pressure of the gas flowing through the second gas passage.

6. The fuel cell as defined in claim 5, wherein:

a differential pressure between the first gas passage and the second gas passage, is produced by a pressure loss in the communicating passage.

7. The fuel cell as defined in claim 6, further comprising:

a differential pressure regulating mechanism which regulates the differential pressure by regulating the pressure loss in the communicating passage.

8. The fuel cell as defined in claim 7, wherein:

the differential pressure regulating mechanism regulates the pressure loss according to the load of the fuel cell.

9. The fuel cell as defined in claim 2, wherein:

the communicating passage is a through-hole passing through the bipolar plate.

10. The fuel cell as defined in claim 9, wherein:

the through-hole has a smaller cross-sectional area than the cross-sectional area of the first gas passage.

11. The fuel cell as defined in claim 2, wherein:

the communicating passage is an external manifold provided outside the bipolar plate which allows the first gas passage and second gas passage to communicate.

12. The fuel cell as defined in claim 2, comprising:

a cooling mechanism which cools the bipolar plate, wherein:

the cooling mechanism cools the bipolar plate so that the temperature of the gas flowing through the second gas passage is lower than the temperature of the gas flowing through the first gas passage.

13. The fuel cell as defined in claim 12, wherein:

the cooling mechanism cools the bipolar plate from the second side.

14. The fuel cell as defined in claim 2, comprising a cooling mechanism which cools the bipolar plate wherein:

the cooling mechanism cools the bipolar plate so that the temperature of the gas flowing through the first gas passage is lower as the gas inlet is nearer.

15. The fuel cell as defined in claim 14, comprising:

a controller which functions to:

regulate the cooling performance of the cooling mechanism so that the temperature of the gas discharged from the gas outlet is higher as the gas pressure or gas usage rate of the fuel cell is larger.

16. The fuel cell as defined in claim 15, wherein:

the controller regulates the cooling performance of the cooling mechanism so that the temperature gradient of the gas flowing through the first gas passage increases as the temperature or humidity of the gas at the gas inlet is higher.

17. The fuel cell as defined in claim 16, wherein:

the controller further functions to regulate the cooling performance of the cooling mechanism so that the temperature gradient of the gas flowing through the first gas passage increases as the gas usage rate of the fuel cell is larger.

18. A fuel cell, comprising:

a membrane electrode assembly, a bipolar plate disposed outside the membrane electrode assembly and a cooling mechanism which cools the bipolar plate, wherein:

the bipolar plate is solid, and comprises:

a gas inlet for introducing gas, a gas outlet for discharging gas, a gas diffusion layer provided between the membrane electrode assembly and the bipolar plate, first gas passages formed on a surface on the side of the membrane electrode assembly, wherein one end of each first gas passage is connected to the gas inlet and the other end of each first gas passage is connected to a return part, and second gas passages formed parallel and adjacent to the first gas passages one after the other on the surface on the side of the membrane electrode assembly, wherein one end of each second gas passage is connected to the first gas passages via the return part and the other end of each second gas passage is connected to the gas outlet, and the cooling mechanism cools the bipolar plate so that the temperature of the gas flowing through the first gas passages is lower as the gas inlet is nearer.

19. The fuel cell as defined in claim 18, comprising:

a controller which functions to:

regulate the cooling performance of the cooling mechanism so that the temperature of the gas discharged from the gas outlet is higher as the gas pressure or gas usage rate of the fuel cell is higher.

20. The fuel cell as defined in claim 19, wherein the controller further functions to:

regulate the cooling performance of the cooling mechanism so that the temperature gradient of the gas flowing through the first gas passages increases as the temperature or humidity of the gas at the gas inlet is higher.

21. The fuel cell as defined in claim 20, wherein the controller further functions to:

regulate the cooling performance of the cooling mechanism so that the temperature gradient of the gas flowing through the first gas passages increases as the gas usage rate of the fuel cell is higher.

* * * * *